(12) United States Patent
Kluss et al.

(10) Patent No.: US 12,729,787 B2
(45) Date of Patent: Sep. 8, 2026

(54) TUBULAR CONNECTOR

(71) Applicant: RELIANCE WORLDWIDE CORPORATION, Atlanta, GA (US)

(72) Inventors: William Vernon Kluss, Woombye (AU); Eliana Pippen, Atlanta, GA (US); Randy Graves, Atlanta, GA (US); Sai Kishore Ravisankar, Alpharetta, GA (US); Samantha Kelly, New York, NY (US)

(73) Assignee: Reliance Worldwide Corporation, Atlanta, GA (US)

( * ) Notice: Subject to any disclaimer, the term of this patent is extended or adjusted under 35 U.S.C. 154(b) by 390 days.

(21) Appl. No.: 17/930,814

(22) Filed: Sep. 9, 2022

(65) Prior Publication Data

US 2023/0003322 A1 Jan. 5, 2023

Related U.S. Application Data

(63) Continuation-in-part of application No. 17/048,557, filed as application No. PCT/US2019/025851 on Apr. 4, 2019, now Pat. No. 11,525,534.

(Continued)

(51) Int. Cl.
*F16L 37/086* (2006.01)
*F16L 37/091* (2006.01)

(52) U.S. Cl.
CPC ......... *F16L 37/086* (2013.01); *F16L 37/0915* (2016.05)

(58) Field of Classification Search
CPC .... F16L 37/0915; F16L 37/091; F16L 37/086
See application file for complete search history.

(56) References Cited

U.S. PATENT DOCUMENTS

| | | | |
|---|---|---|---|
| 788,600 | A | 5/1905 | Rogers |
| D194,015 | S | 11/1962 | Stringham |

(Continued)

FOREIGN PATENT DOCUMENTS

| | | | | |
|---|---|---|---|---|
| AT | 512772 B1 * | 11/2013 | ............ F16L 37/091 |
| CN | 209960045 U | 1/2020 | |

(Continued)

OTHER PUBLICATIONS

WO—International Patent Application No. PCT/CN2021/082998; Mar. 25, 2021; Reliance Worldwide Corporation.

(Continued)

*Primary Examiner* — Matthew Troutman
*Assistant Examiner* — James A Linford
(74) *Attorney, Agent, or Firm* — Barnes & Thornburg LLP

(57) ABSTRACT

A push-to-connect fitting that includes a connector body, a sealing member, a grab ring, a cartridge, a retainer sleeve, a plurality of latches, and an interference portion. The sealing member is configured to form a sealing engagement with a fluid conduit. The grab ring includes a plurality of teeth configured for coupling to the fluid conduit. The retainer sleeve is received over at least part of the cartridge and is received over at least part of the connector body. The plurality of latches are located on the retainer sleeve and are configured to secure the retainer sleeve to the connector body to facilitate retention of the sealing member, the grab ring, and the cartridge. The interference portion is configured to engage the retainer sleeve to substantially prevent rotation of the retainer sleeve relative to the connector body.

44 Claims, 17 Drawing Sheets

Related U.S. Application Data

(60) Provisional application No. 63/242,951, filed on Sep. 10, 2021, provisional application No. 62/718,562, filed on Aug. 14, 2018.

(56) References Cited

U.S. PATENT DOCUMENTS

| | | | |
|---|---|---|---|
| 4,026,006 | A | 5/1977 | Moebius |
| D354,801 | S | 1/1995 | Grant et al. |
| 5,538,297 | A | 7/1996 | McNaughton et al. |
| 5,868,435 | A | 2/1999 | Bartholomew |
| D449,515 | S | 10/2001 | Sato |
| D461,545 | S | 8/2002 | Nishio |
| D482,761 | S | 11/2003 | Gotoh et al. |
| D615,165 | S | 5/2010 | McAlpine et al. |
| D638,919 | S | 5/2011 | Grether |
| D710,977 | S | 8/2014 | Chen |
| 8,813,348 | B2 | 8/2014 | Williams et al. |
| D713,943 | S | 9/2014 | Luke |
| D746,952 | S | 1/2016 | Gledhill et al. |
| D746,958 | S | 1/2016 | Gledhill et al. |
| 9,228,681 | B2 | 1/2016 | Kluss |
| D754,303 | S | 4/2016 | Smith |
| D823,442 | S | 7/2018 | Sugatani et al. |
| D886,250 | S | 6/2020 | Ji Ho et al. |
| D902,360 | S | 11/2020 | Kluss et al. |
| D908,846 | S | 1/2021 | Kluss et al. |
| D908,848 | S | 1/2021 | Kluss et al. |
| 10,969,047 | B1 | 4/2021 | Crompton et al. |
| D919,775 | S | 5/2021 | Kluss et al. |
| D943,407 | S | 2/2022 | Buckley et al. |
| D943,715 | S | 2/2022 | Kwak et al. |
| D984,597 | S | 4/2023 | Wang |
| D986,393 | S | 5/2023 | Smith |
| D990,300 | S | 6/2023 | Liebelt |
| D991,023 | S | 7/2023 | Cooper et al. |
| D996,581 | S | 8/2023 | Li et al. |
| D996,584 | S | 8/2023 | Nakano et al. |
| D999,345 | S | 9/2023 | Yu |
| D1,000,585 | S | 10/2023 | Koiwa |
| 11,796,101 | B2 | 10/2023 | Watson et al. |
| 2005/0285394 | A1 | 12/2005 | Muto |
| 2006/0244258 | A1 | 11/2006 | Baumgartner |
| 2009/0032170 | A1 | 2/2009 | Williams |
| 2011/0025054 | A1 | 2/2011 | Kluss |
| 2013/0181446 | A1 | 7/2013 | Le Clinche |
| 2015/0159794 | A1 | 6/2015 | Bobo et al. |
| 2016/0040812 | A1 | 2/2016 | Lai |
| 2016/0273695 | A1 | 9/2016 | Bobo et al. |
| 2017/0082229 | A1 | 3/2017 | Meissner |
| 2020/0263818 | A1 | 8/2020 | Prince |
| 2020/0378536 | A1 | 12/2020 | Osteen et al. |
| 2021/0239248 | A1 | 8/2021 | Watson et al. |
| 2023/0288001 | A1 | 9/2023 | Kluss et al. |

FOREIGN PATENT DOCUMENTS

| | | | |
|---|---|---|---|
| DE | 10114326 | A1 | 10/2002 |
| EP | 3845791 | A1 | 7/2021 |
| FR | 3086366 | A1 | 3/2020 |
| GB | 1555640 | | 11/1979 |
| GB | 2143918 | A | 2/1985 |
| WO | 199703314 | A1 | 1/1997 |

OTHER PUBLICATIONS

WO—International Patent Application No. PCT/US2019/025851; Apr. 4, 2019; Reliance Worldwide Corporation.

Extended Search Report in EP Application No. 22868325.6, dated Jun. 5, 2025.

Examination Report in NZ Application No. 809749, dated Oct. 9, 2025.

* cited by examiner 404
477
136
410

406
402
404
477
410
136
400

154
146
128
120
124
122

120
124
132

120
128

120
208
132
480
122
205
242
214
210
312
206
136
314
140
146
458
154

120
208
132
242
214
210
312
206
136
314
140
146
458
154

308
310,313
122
311
328
302
326
314
316
314
303
300

122
308
328
302
326
311
316
310,303
312
314
304
128
384
303
368
300

128
120
204

124d
120
204

120
124d
204
310
128

532
128
530
214
200
310
326
212
124

532
128
530
200
310
326
212
124

TUBULAR CONNECTOR

CROSS-REFERENCE TO RELATED PATENT APPLICATION

This application is a continuation-in-part of and claims priority to U.S. patent application Ser. No. 17/048,557, filed Oct. 16, 2020, which claims the benefit of U.S. Provisional Patent Application No. 62/718,562, filed Aug. 14, 2018, and claims the benefit of U.S. Provisional Patent Application No. 63/242,951, filed Sep. 10, 2021, which are incorporated herein by reference in their entireties.

FIELD

The present disclosure relates generally to pipe fittings. More specifically, the present disclosure relates to push-to-connect fittings with improved burst resistance.

BACKGROUND

Conduits are used to carry a variety of liquids and/or gases. Couplings, connectors, and fittings are used to join the conduits in various ways so that the conduits can be arranged in different configurations to move media through the conduits. The conduits may be stiff or rigid as with metal or plastic pipes used in household plumbing applications, or the conduits may be flexible. Connectors are used for end-to-end connection of conduits, or they can route conduits at different directions relative to the conduit axis. For example, connectors can be employed to change the direction of piping, such as by a 45° or 90° angle with respect to a flow passage through the pipe to which the connector is connected. Connectors can also be employed to branch or split piping in different directions. For example, a single pipe section can be connected by a T-fitting or a Y-fitting or a multi-conduit joint or a change in diameter.

SUMMARY

The present disclosure relates to connectors for conduits with improved ease of assembly and coupling, among other benefits. Certain conduit connectors may be difficult to assemble or require special tools in order to couple the connectors to a conduit. For example, threaded connectors may require a wrench to hold one part while rotating a mating part. Thus, there is a need for a connector that does not require tools for coupling with a conduit, such that a substantially watertight seal may be achieved manually between the connector and the conduit without tools.

Further, some existing connectors require deformation to join two parts or to join the connector to the conduit. For example, the ends of garden hoses have an outer portion of a hose bib crimped around the outside of the conduit to connect the male or female hose bib to the garden hose. In some connectors, a user must manually deform an end portion of a sleeve so that two parts of a connector cannot move axially apart, thus securing the parts of the connector together. There is thus a need for a simpler connector that does not require manual deformation to join parts.

Some connectors are irreversibly coupled to a conduit and may not be removed except by destroying the connector. A welded or soldered pipe joint is a historic example of a permanent connector. However, it may be advantageous to uncouple a conduit and reuse the connector. There is thus a need for a connector that may be uncoupled without destroying the connector. The connectors according to the implementations discussed below address these issues.

It is desirable that the fluid connectors not leak, as it may lead to loss of system pressure, or pooling of liquids, for example. The connectors according to the implementations discussed below is configured to provide a fluid-tight seal at least at pressures several times greater than the expected operational pressure of the tubular connector.

Various exemplary descriptions below contain instances of representative ranges, dimensions and/or tolerances for certain components. These are provided by way of illustration and not by way of limitation. Unless otherwise indicated, all numbers expressing quantities of properties, parameters, conditions, and so forth, used in the specification and claims are to be understood as being modified in all instances by the terms "about" or "approximately." Accordingly, unless indicated to the contrary, the numerical parameters set forth in the following specification and attached claims are approximations. Any numerical parameter should at least be construed in light of the number reported significant digits and by applying ordinary rounding techniques. The terms "about" or "approximately" when used before a numerical designation, e.g., a dimension of a measured property, indicates approximations which may vary by (+) or (−) 10%, 5% or 1%.

At least one embodiment relates to a push-to-connect fitting. The push-to-connect fitting includes a connector body, a sealing member, a grab ring, a cartridge, a retainer sleeve, a plurality of latches, and an interference portion. The connector body has a fluid passage that extends at least partially therethrough. The sealing member is configured to form a sealing engagement with a fluid conduit. The grab ring includes a plurality of teeth configured for coupling to the fluid conduit. The cartridge is positioned adjacent to at least part of the grab ring and has a hollow portion therethrough. The retainer sleeve is received over at least part of the cartridge and is received over at least part of the connector body. The plurality of latches are located on the retainer sleeve and are configured to secure the retainer sleeve to the connector body to facilitate retention of the sealing member, the grab ring, and the cartridge. The interference portion is positioned between the connector body and the retainer sleeve when the push-to-connect fitting is assembled. The interference portion is configured to engage the retainer sleeve to substantially reduce, inhibit, or prevent rotation of the retainer sleeve relative to the connector body.

In some embodiments, the push-to-connect fitting further comprises a demount body movable within the hollow portion of the cartridge and configured to engage the plurality of teeth of the grab ring to facilitate decoupling of the plurality of teeth from the fluid conduit.

In some embodiments, the push-to-connect fitting further comprises a protection ring positioned within the connector body and positioned between the sealing member and the grab ring. The protection ring includes an inclined surface such that the inclined surface tapers to a smaller diameter as the inclined surface extends away from the grab ring.

In some embodiments, the retainer sleeve includes an inner sleeve surface having a first diameter and the interference portion includes one or more protrusions with a second diameter that is greater than the first diameter. The first diameter and the second diameters are sized such that an interference fit exists between the interference portion and the retainer sleeve.

In some embodiments, the retainer sleeve further includes a compliant material such that an end portion of the retainer sleeve expands to a third diameter when the end portion engages the interference portion. The third diameter is greater than the second diameter.

In some embodiments, the interference portion is formed as an annular member having a diameter larger than a diameter of the connector body. The interference portion is also integrally formed with the connector body, and the interference portion extends radially from the connector body in a direction away from the fluid passage.

In some embodiments, the push-to-connect fitting further comprises a catch surface and a plurality of latches. The catch surface is located on the connector body and the plurality of latches are configured to engage the catch surface to facilitate coupling of the retainer sleeve to the connector body.

In some embodiments, each of the plurality of latches is configured to actuate about a sidewall connected thereto such that each of the plurality of latches engages with the catch surface when the retainer sleeve engages the interference portion.

In some embodiments, the plurality of latches are configured to move in a direction away from or toward the catch surface in order to engage the catch surface.

In some embodiments, the plurality of latches may include one or more protruding portions that extend transversely from a sidewall connected thereto.

In some embodiments, the engagement of the plurality of latches with the catch surface inhibits rotation of the retainer sleeve relative to the connector body.

In some embodiments, each of the plurality of latches includes a released position and a locked position. When the retainer sleeve is engaged by the interference portion, each of the plurality of latches are in the locked position.

In some embodiments, the interference portion further comprises a shoulder surface having a frustoconical profile configured to engage an end portion of the retainer sleeve as the retainer sleeve is received over the interference portion.

In some embodiments, the shoulder surface facilitates alignment of the retainer sleeve.

In some embodiments, the retainer sleeve comprises a first retainer sleeve, and the connector body further comprises a first connector end coupled to the first retainer sleeve and a second connector end coupled to a second retainer sleeve. The first connector end and the second connector end are in fluid communication with one another via the fluid passage.

Another embodiment relates to a plumbing fitting. The plumbing fitting includes a first connector assembly, a second connector assembly, and a fluid passage extending between the first connector assembly and the second connector assembly. The first connector assembly includes a first connector body, a first retainer sleeve, and a first interference portion. The first connector body is centered along a first axis and is configured to receive a first fluid conduit end. The first retainer sleeve is coupled to the first connector body and is configured to receive the first fluid conduit end. The first interference portion is interposed between the first connector body and the first retainer sleeve. The first interference portion is configured to prevent rotation of the first retainer sleeve about the first axis relative to the first connector body. The second connector assembly includes a second connector body, a second retainer sleeve, and a second interference portion. The second connector body is centered along a second axis and is configured to receive a second fluid conduit end. The second connector body is in fluid communication with the first connector body. The second retainer sleeve is coupled to the second connector body and is configured to receive the second fluid conduit end. And the second interference portion is interposed between the second connector body and the second retainer sleeve. The second interference portion is configured to prevent rotation of the second retainer sleeve about the second axis relative to the second connector body.

In some embodiments, the first retainer sleeve includes a first inner sleeve surface having a first diameter, and the first interference portion has a second diameter greater than the first diameter. The first inner sleeve surface and the first interference portion are sized such that an interference fit exists between the first interference portion and the first retainer sleeve.

In some embodiments, the first interference portion is integrally formed with the first connector body. The first interference portion extends radially from the first connector body in a direction away from the first axis.

In some embodiments, the first retainer sleeve further comprises a compliant material. The compliant material is configured such that an end portion of the first retainer sleeve engaged by the first interference portion expands to a third diameter when the end portion engages the first interference portion. The third diameter is greater than the second diameter.

In some embodiments, the plumbing fitting further comprises a catch surface and a plurality of latches. The catch surface is located on the first connector body. The plurality of latches are located on the first retainer sleeve and are configured to engage the catch surface to facilitate coupling of the first retainer sleeve to the first connector body.

In some embodiments, each of the plurality of latches is configured to actuate about a sidewall connected thereto and engage with the catch surface when the first interference portion engages the retainer sleeve.

In some embodiments, each of the plurality of latches includes a released position and a locked position. When the first retainer sleeve is engaged by the first interference portion, the each of the plurality of latches are in the locked position.

Another embodiment relates to a connector assembly. The connector assembly includes a connector body and a retainer sleeve. The connector body has a fluid passage that extends at least partially therethrough. The connector body also includes a first end and a second end opposite the first end. A first connector flange extends radially away from the connector body and is positioned between the first end and the second end. The first connector flange has a first diameter. A second connector flange extends radially from the connector body and is positioned between the first connector flange and the second end. The second connector flange has a second diameter greater than the first diameter. The retainer sleeve is configured for coupling to the connector body and is configured for extending around the fluid passage. The retainer sleeve includes a first sleeve end and a second sleeve end opposite to the first sleeve end. The retainer sleeve further includes an inner sleeve surface having a third diameter, where the third diameter is less than the second diameter. The retainer sleeve further includes a plurality of latches positioned circumferentially about the inner sleeve surface and extending radially inward relative to the inner sleeve surface. The retainer sleeve is configured such that when the retainer sleeve is coupled to the connector body and the second connector flange engages a portion of the inner sleeve surface proximate to the first sleeve end, the portion of the inner sleeve surface proximate to the first sleeve end expands to a fourth diameter greater than the second diameter responsive to deformation of the retainer sleeve, and the plurality of latches actuate inward toward the connector body when the first sleeve end expends to the fourth diameter.

In some embodiments, the connector body further comprises a catch surface positioned on the first connector flange and extending circumferentially about the fluid passage. The plurality of latches are configured to engage the catch surface when the retainer sleeve is coupled to the connector body.

In some embodiments, the connector body further comprises a shoulder surface positioned between the first connector flange and the second connector flange. The shoulder surface tapers outward toward the second connector flange to facilitate centering of the retainer sleeve around the connector body.

In some embodiments, the third diameter is less than the second diameter by between about 0.01 and about 0.15 millimeters, inclusive, such that an interference fit is formed between the retainer sleeve and the connector body.

In some embodiments, the third diameter is less than the second diameter by between about 0.2 and about 0.5 millimeters, inclusive, such that an interference fit is formed between the retainer sleeve and the connector body.

In some embodiments, the retainer sleeve is a first retainer sleeve and the connector body further comprises a first connector end and a second connector end. The first connector end is coupled to the first retainer sleeve. The second connector end is coupled to a second retainer sleeve, the second retainer sleeve being substantially similar to the first retainer sleeve. The first connector end and the second connector end are in fluid communication with one another via the fluid passage.

Another embodiment relates to a method of manufacturing a connector assembly. The method includes the steps of obtaining a connector body and obtaining a retainer sleeve configured for receipt over at least part of the connector body. The retainer sleeve extends around the axis. The retainer sleeve includes a first sleeve end, and second sleeve end opposite to the first sleeve end, and an inner sleeve surface having an inner sleeve diameter. The method further includes positioning an interference portion circumferentially about the connector body, the interference portion being an annular body having a retaining diameter greater than the inner sleeve diameter. A plurality of internal components are then positioned. The method further includes pressing the retainer sleeve around the connector body and the interference portion such that the interference portion is interposed between the retainer sleeve and the connector body and such that the interference portion engages a portion of the inner sleeve surface proximate to the second sleeve end and causes the portion of the inner sleeve surface proximate to the first sleeve end to expand in diameter to a coupling diameter greater than the inner sleeve diameter in response to deformation of the retainer sleeve.

In some embodiments, pressing the retainer sleeve around the connector body and the interference portion forms an interference fit between the retainer sleeve and the interference portion such that rotation of the retainer sleeve relative to the connector body about the axis is prevented.

In some embodiments, the connector body further comprises a catch surface and the retainer sleeve further comprises a plurality of latches configured to engage the catch surface when the retainer sleeve is coupled to the connector body. The method further comprises pressing the retainer sleeve around the connector body and the interference portion such that the plurality of latches engage the catch surface.

In some embodiments, the connector body further comprises a shoulder surface defining a frustoconical profile that tapers outward toward the interference portion. The method further comprises pressing the retainer sleeve around the connector body and the interference portion such that the inner sleeve surface engages the shoulder surface. Engagement of the retainer sleeve with the shoulder surface causes expansion of the second sleeve end to the coupling diameter and facilitates centering of the retainer sleeve about the connector body and the interference portion.

A further embodiment relates to a connector. The connector includes a connecting body having a fluid passage that extends at least part way therethrough, a seal configured to provide a seal with an outer portion of a fluid tube and a cartridge located near the connecting body. The cartridge has a hollow portion therethrough. The connector further includes a grab part that has one or more teeth that are configured to retain the fluid tube. The grab part can be located between the cartridge and the seal. The connector includes a demount part movable within the hollow portion of the cartridge and configured to move the one or more teeth to a position to allow the fluid tube to be released. The connector also includes a sleeve covering at least part of the cartridge and the connecting body. A latch is located on one of the sleeve or the connecting body and a mating catch is located on the other of the sleeve or the connecting body such that engagement of the latch with the catch connects the sleeve to the connecting body and assists in restraining movement of the cartridge.

In some embodiments, a connector assembly includes a connecting body with a fluid passage that extends at least part way therethrough; a first connector including the connecting body; and a second connector including the connecting body.

Another embodiment relates to a connector. The connector includes a connecting body that has a fluid passage that extends at least part way therethrough; a seal ring configured to provide a seal with an outer portion of a fluid tube; and a cartridge located near the connecting body. The cartridge has a hollow portion therethrough. The connector includes a grab part having one or more teeth that are configured to retain the fluid tube. The grab part may be located between the cartridge and the seal ring. The connector includes a demount part that is movable within the hollow portion of the cartridge and configured to move the one or more teeth to a position to allow the fluid tube to be released. The connector further includes a sleeve covering at least part of the cartridge and the connecting body to provide a connection therebetween. The demount part is structured such that when an external force is applied over a distance from at least a free end of the demount part to the cartridge, the demount part does not move to a position that engages with the teeth to allow the fluid tube to be released.

Another embodiment relates to a kit for connecting two fluid tubes. The kit includes a plurality of connectors and a fluid tube.

A further embodiment relates to a connector for a fluid tube having an outer diameter. The connector has proximal and distal ends and extend along a longitudinal axis. The connector includes a connector body that has a fluid passage extending at least part way through the body and a tube stop to limit passage of the fluid tube through the connector body. The connector includes a sealing ring encircling the longitudinal axis and having an internal diameter to provide a fluid tight seal with the fluid tube when the fluid tube passes through the sealing ring. The connector includes a protecting ring encircling the longitudinal axis. The sealing ring is located between a shoulder on the connector body and the protecting ring. The connector includes a cartridge part encircling the longitudinal axis and holding the protecting ring against the connector body and a grab ring. The grab ring has a plurality of teeth encircling the longitudinal axis and extending inward and toward the connector body a distance sufficient to grab the fluid tube during use. The grab ring is held between the cartridge part and the protecting ring. The connector also includes a demount ring encircling the longitudinal axis and held between a shoulder on the cartridge part and the grab ring. The demount ring being axially movable a distance sufficient to push the teeth outward and release the fluid tube. The connector also includes a tubular sleeve encircling the cartridge part and the protecting ring and part of the connector body. The sleeve has a resiliently flexible latch latched to the connector body, and holding the cartridge part against the protecting ring and holding the protecting ring against the connector body. The sleeve has a proximal end with a sleeve opening through which the fluid tube passes.

BRIEF DESCRIPTION OF THE FIGURES

By way of example only, other embodiments of the present disclosure will be described more fully hereinafter with reference to the accompanying figures, in which like numbers refer to like parts throughout, wherein.

DETAILED DESCRIPTION

As used herein, the relative directions and terms "inward" and "outward" are referenced with respect to a longitudinal axis, with inward being in a direction radially toward the longitudinal axis and outward being in a direction radially away from the longitudinal axis.

Figure 1:
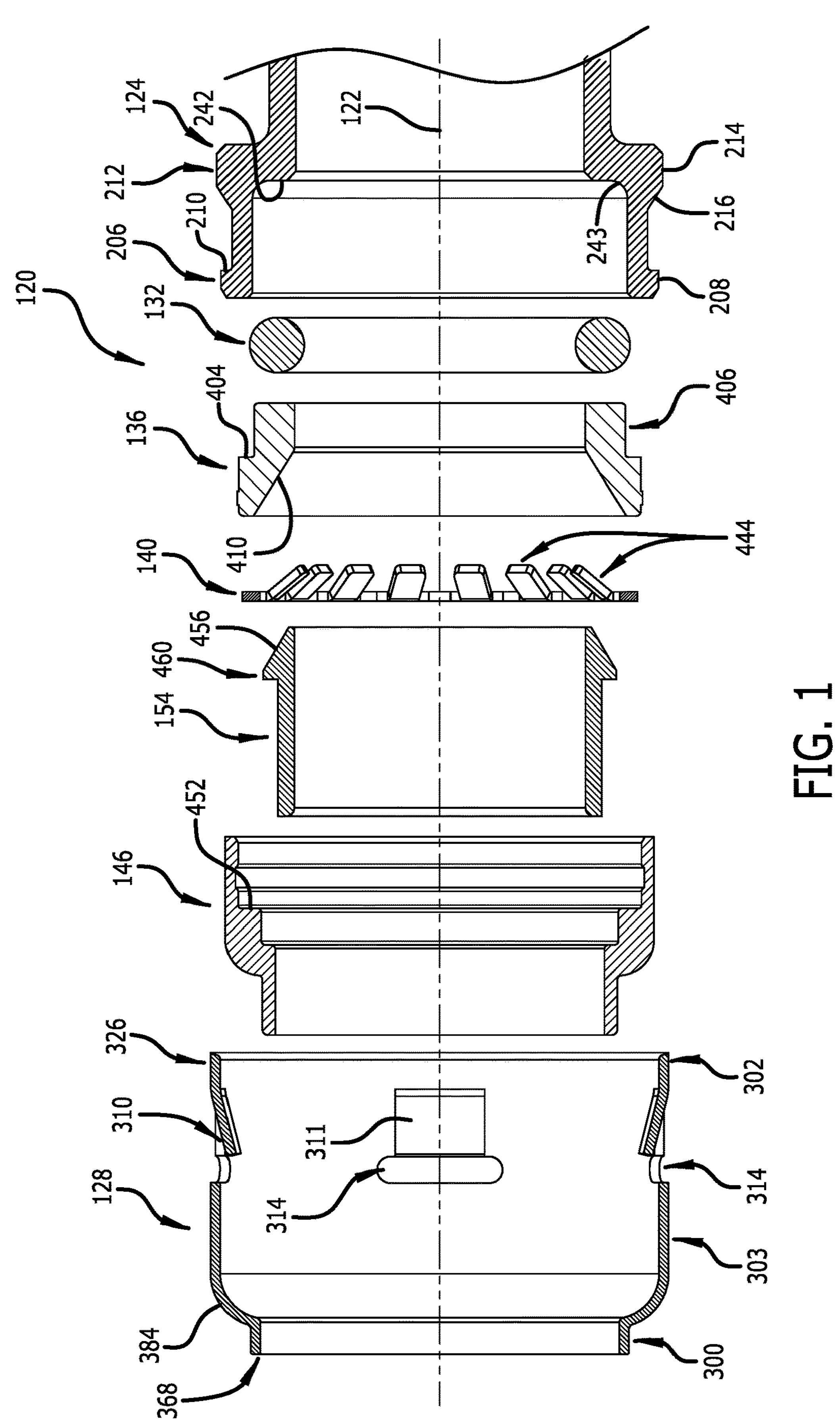
FIG. 1 is an exploded side, cross-sectional view of a connector assembly taken along section 1-1 of FIG. 11, according to an example embodiment.

The relative directions and terms "distal" and "proximal" are used with respect to a connector assembly fastened to an end of a fluid conduit, with the distal direction being toward the end of the connector assembly on the end of the fluid conduit (e.g., the receiving end of the connector assembly; to the right side of FIG. 1), and the proximal direction being toward the beginning of the fluid conduit to which the connector assembly is fastened (e.g., to the left side of FIG. 1). The relative direction and term lateral or laterally are in a plane generally orthogonal to the longitudinal axis.

Referring generally to the Figures, a connector assembly (e.g., plumbing fitting, push-to-connect fitting, etc.) 120 is shown. The connector assembly 120 is configured for sealingly engaging (e.g., forming a substantially watertight connection with) an end portion of a fluid conduit, such as a copper pipe, PEX tubing, CPVC pipe, PVC tubing, and the like. The connector assembly 120 may be used with fluid conduits of varying diameters, including fluid conduits having a diameter less than 0.25 inches to fluid conduits having a diameter of greater than 2 inches or more.

Referring generally to FIGS. 1-26, the connector assembly 120 is shown. The connector assembly 120 includes an annular connector body 124, a retainer sleeve (e.g., sleeve body) 128, a sealing member (e.g., sealing ring) 132, a protection ring (protection body) 136, a grab ring (e.g., grab body) 140, a cartridge (e.g., cartridge body) 146, and a demount body (e.g., demount ring) 154.

In brief, the connector body 124 includes a catch surface 210 at an end of the connector body 124. The catch surface 210 extends circumferentially around the connector body 124. The retainer sleeve 128 has at least one and, in this embodiment, a plurality of latches 310 extending inwardly at an end of the connector assembly 120. The latches 310 engage the catch surface 210 to connect the retainer sleeve 128 to the connector body 124. In the illustrated embodiment, four equally spaced latches are formed along the retainer sleeve 128; however, different numbers and configurations of latches can be employed without departing from the scope of the present disclosure, such as two, three, five, or six latches equally or unequally spaced along the retainer sleeve 128.

The connector assembly 120 has other parts, as outlined above and in further detail below, held between and preferably contained within the connector body 124 and retainer sleeve 128. For instance, the sealing member 132 is urged toward (e.g., compressed against) an inner shoulder 242 of the connector body 124 by an inwardly stepped projection 406 of the protection ring 136. The grab ring 140 has an annular base 442 with a plurality of protrusions in the form of teeth 444 extending inward and distally toward the connector body 124. The cartridge 146 has a tubular wall 448 proximate to a distal end of the cartridge 146 and a smaller diameter proximal end 450 opposite to the tubular wall 448. The tubular wall 448 fits into a recess in the connector body 124 having an annular, inner shoulder 242 that limits the motion along the longitudinal axis 122 in the longitudinal direction. The tubular wall 448 extends along the longitudinal axis 122 and encloses the sealing member 132, the protection ring 136, and the grab ring 140.

The demount body 154 is also located within the retainer sleeve 128 and includes a tubular proximal end (e.g., free end) 458 passing through the proximal end 450 of the cartridge 146 as the demount body 154 extends along the longitudinal axis 122. A stop flange 460 is positioned between an inclined distal end surface 456 and the tubular proximal end 458. The stop flange 460 contacts a second internal shoulder 462 of the cartridge 146. The inclined distal end surface 456 may have a frustoconical profile that inclines toward the longitudinal axis 122 and inclines toward the connector body 124. The inclined distal end surface 456 is further configured to generally conform to the conical shape formed by the inclined teeth 444 of the grab ring 140 and to incline toward the sealing member 132.

To further elaborate on the components above, the connector body 124 may be formed of metal material (e.g., brass, such as Bi brass, naval brass, Si brass; stainless steel, etc.); a plastic or other polymeric material suitable for the intended application, such as polyethylene, PPR, or UHMWP, or any combination thereof; a composite material; or any combination thereof. The fluid transported by the fluid conduit and pressures will determine the suitable material for the conduits and for the connector body 124.

Figures 23A, 23B, 23C:
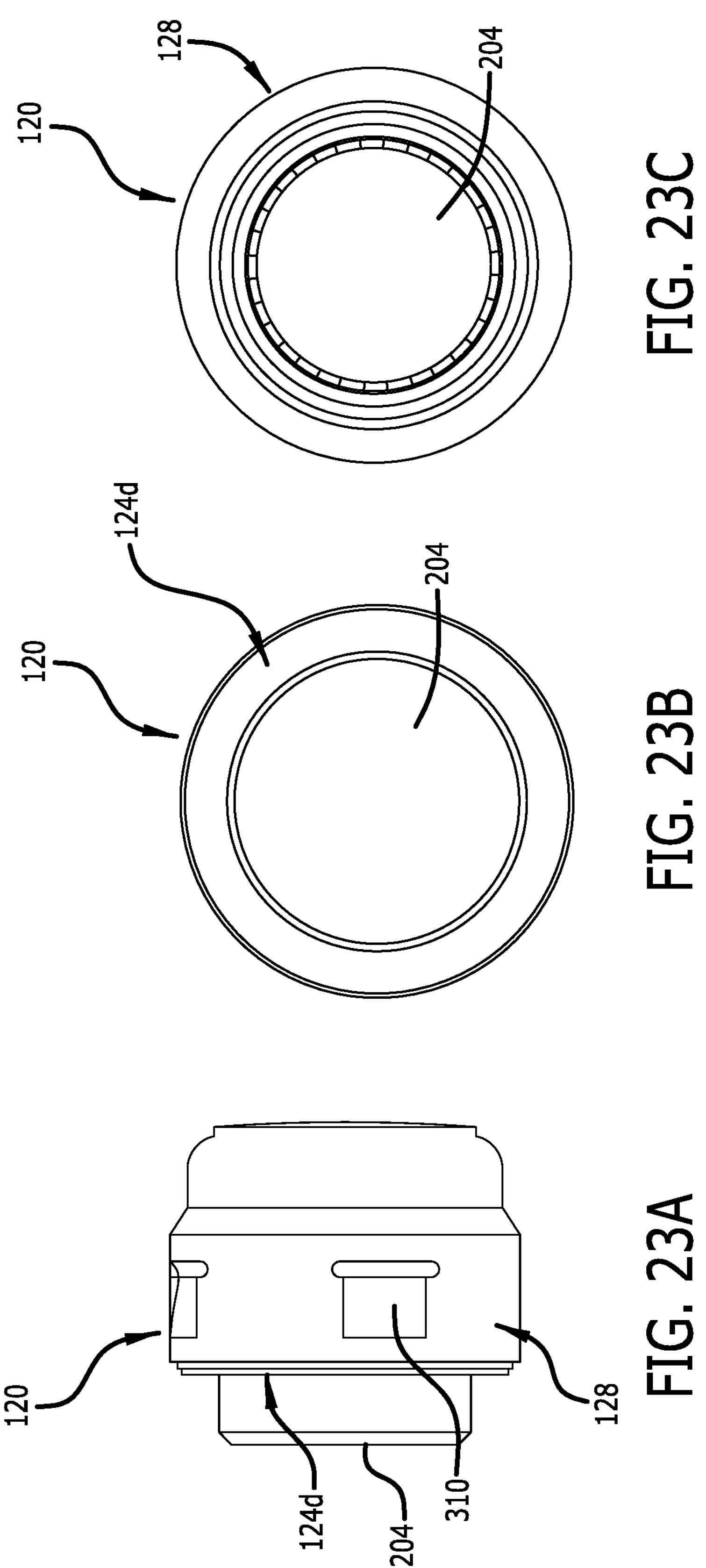
FIG. 23A is a side view of a plumbing fitting having a connector assembly of FIG. 1 and an end wall, according to an example embodiment.
FIG. 23B is a distal view of the plumbing fitting of FIG. 23A.
FIG. 23C is a proximate view of the pluming fitting of FIG. 23A.
Figures 24, 25, 26:
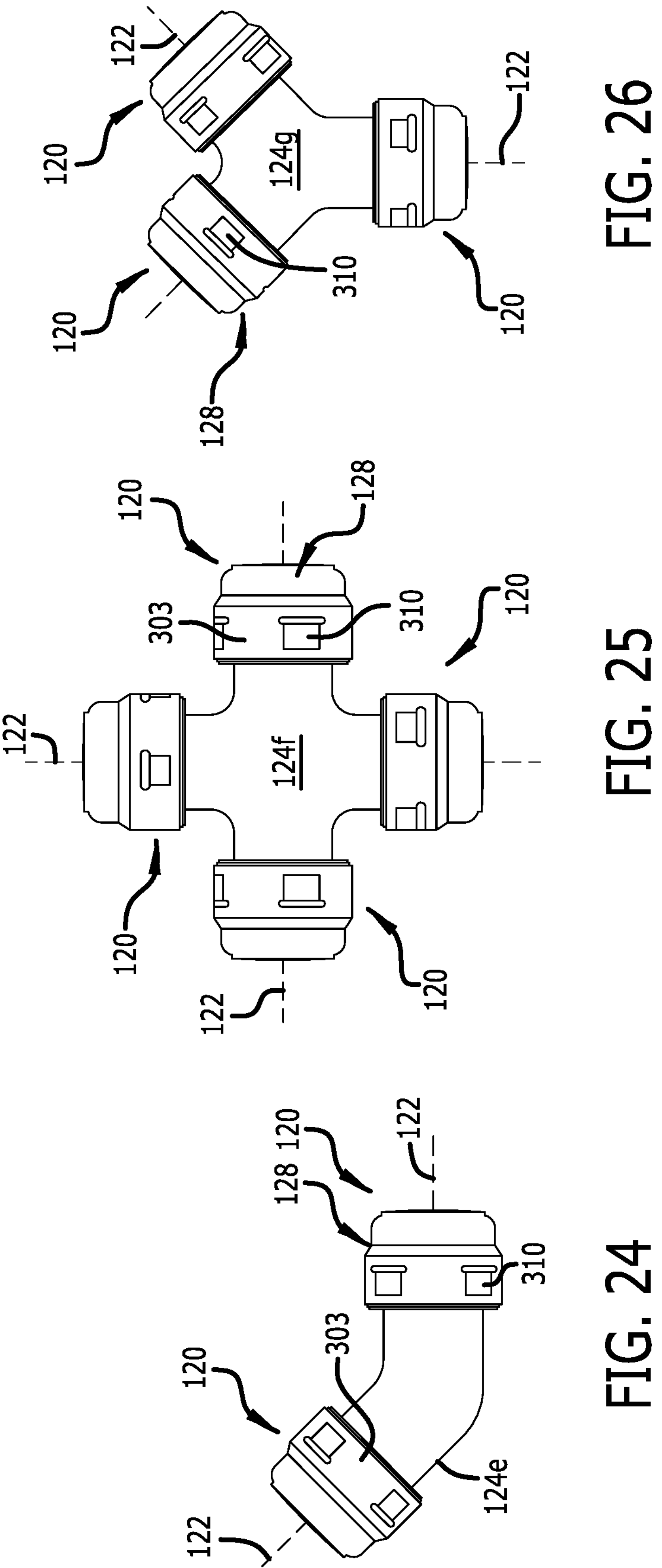
FIG. 24 is a side view of a plumbing fitting having a plurality of the connector assemblies of FIG. 1, according to an example embodiment.
FIG. 25 is a side view of a plumbing fitting having a plurality of the connector assemblies of FIG. 1, according to an example embodiment.
FIG. 26 is a side view of a plumbing fitting having a plurality of the connector assemblies of FIG. 1, according to an example embodiment.
Figure 27:
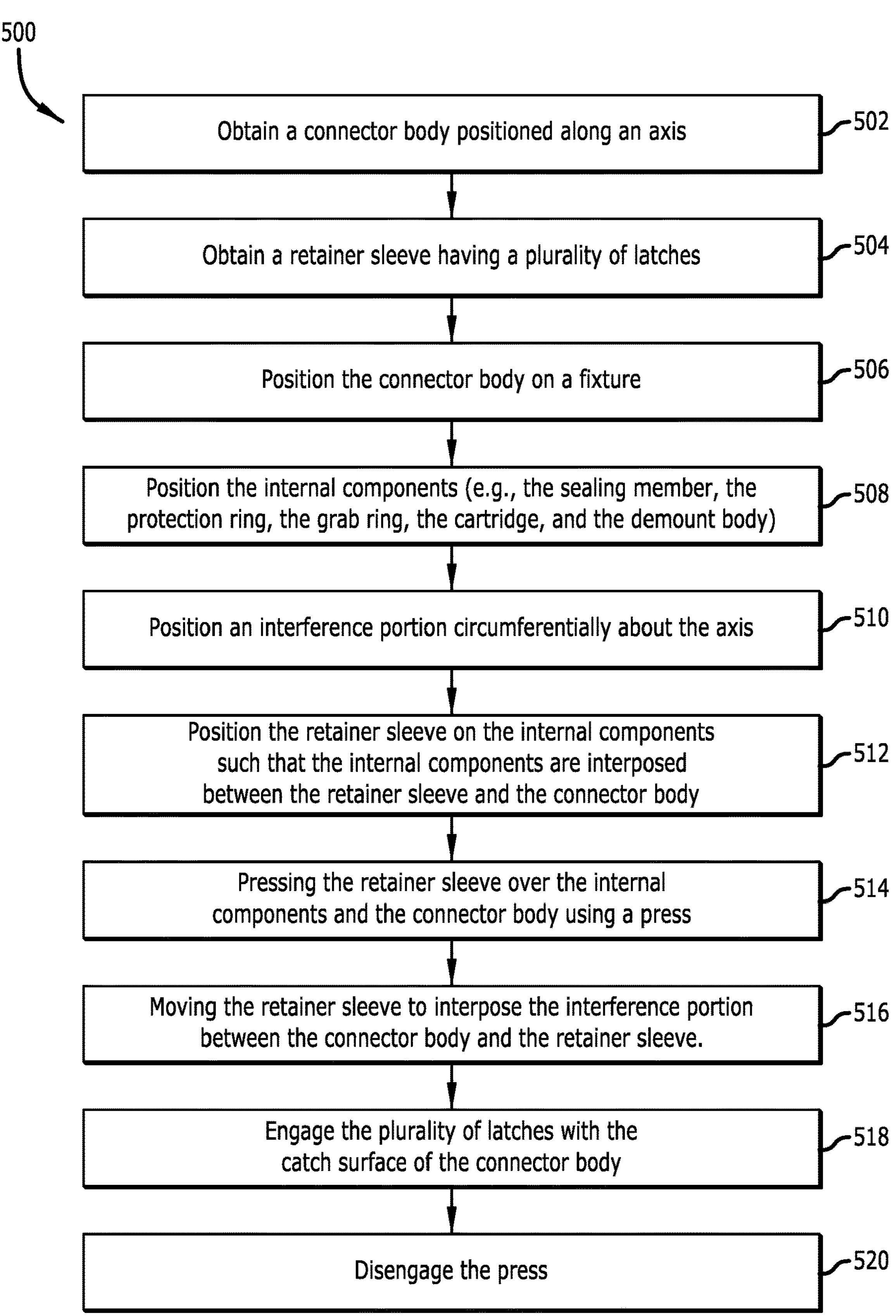
FIG. 27 is a flow chart of a method of assembling a connector assembly, according to an example embodiment.

In some embodiments, the connector body 124 may be a straight-line connector body **124*a* or coupler (FIG. 20), a T-connector body 124*b* (FIG. 21), an elbow connector body 124*c* (FIG. 22), a blind-end connector body 24*d* (FIGS. 23A-23C) which blocks flow through the fluid conduit (similar to connector body 124), a connector body configured to receive different diameter fluid conduits, an angle connector body 124*e* (FIG. 24), a multi-line (or 4-way) connector body 124*f* (FIG. 25), a wye (Y) connector body 124*g* (FIG. 26), a tee-wye connector body, another type of connector body, or combinations of connector bodies. The connector bodies 124*a*-124*g* may have a similar or the same catching arrangement to the catch surface 210, so as to be complementary to the catch surface 210. As indicated in FIGS. 23A-23C, the connector body 124*d* that is a blind-end connector body has an end wall 204 closing off the fluid passage through the connector body 124*d*. The end wall 204 forms a tube stop that limits movement of the fluid conduit through the connector body 124*d***. In some embodiments, the connector assembly can be incorporated as part of a plumbing device, such as a valve, gauge, etc.

A first end 200 of the connector body 124 is slightly chamfered so it may resiliently urge the resilient laches 310 outward as the retainer sleeve 128 and the connector body 124 are moved relative to each other, until the latches 310 engage the catch surface 210. It will be appreciated that the chamfering may be included on any one of the connector bodies **124*a*-124*g*. An inclined exterior shoulder surface 216 adjacent the catch surface 210 may optionally be provided with the shoulder surface 216 inclined inward and toward the first end 200 so as to be aligned with the latches 310. The shoulder surface 216 may prevent the latches 310 from being bent inward and may strengthen the latch-catch connection (e.g., connection between the latches 310 and the catch surface 210) to better resist separation of the connector assembly 120 along the longitudinal axis 122**.

Referring specifically to FIG. 1, an exploded, cross-sectional view of the connector assembly 120 is shown. The connector assembly 120 extends along, and is centered on, a longitudinal axis 122. When the connector assembly 120 is fully assembled, as shown in FIGS. 9-13 and 19, all of the sealing member 132, the protection ring 136, the grab ring 140, the cartridge 146, and the demount body 154 are positioned between (e.g., interposed between) the retainer sleeve 128 and the connector body 124. The retainer sleeve 128 and the connector body 124 are coupled together such that the rest of the connector assembly 120 (the sealing member 132, the protection ring 136, the grab ring 140, the cartridge 146, and the demount body 154) is maintained in confronting relation to each other (e.g., pressed, compressed, sandwiched together, etc.) without each component being coupled together individually, such as by potting, adhesives, fasteners, latches, and the like.

Figure 14:
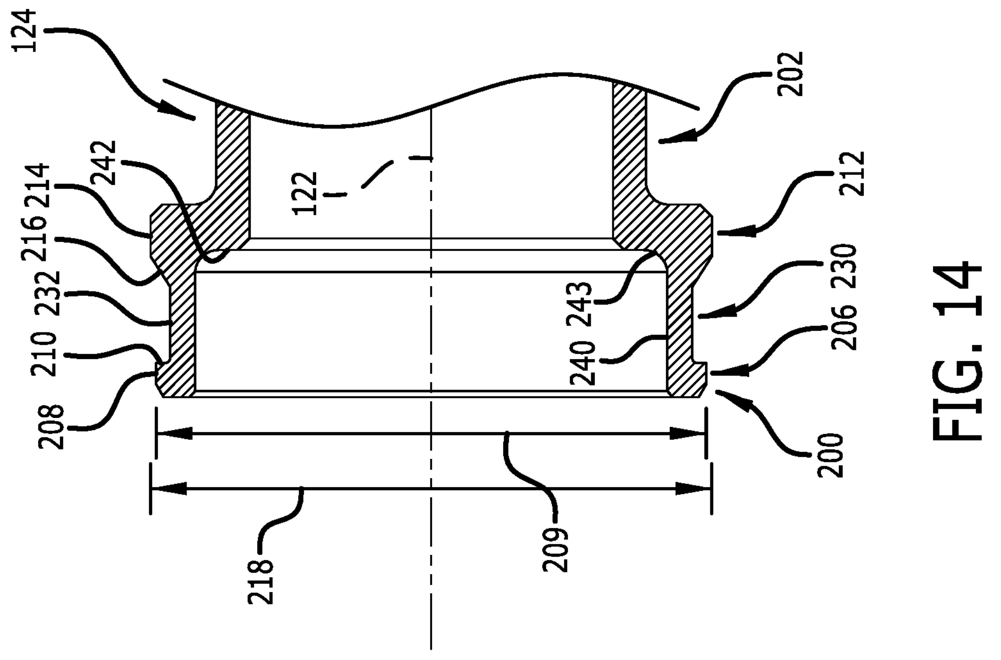
FIG. 14 is a side cross-sectional view a connector body of the connector assembly of FIG. 1, according to an example embodiment.

The sealing member 132 is formed of a resilient material, such as rubber, EPDM, or other suitable elastomers. The sealing member 132 is shown as an O-ring with a circular cross-section. However, in some embodiments, the sealing member 132 may have various cross-sectional shapes, such as rectangular, oblong, pill shape, and the like. The inner and outer diameters of the sealing member 132 are selected to fit into and seal against the connector body 124 and to form a substantially fluid tight seal with a fluid conduit passing through the inner diameter of the sealing member 132. In some embodiments, the inner shoulder 242 is configured to seal against the sealing member 132. As shown in FIG. 14, the inner shoulder 242 is contiguous with the inner surface 240 at a curved corner 243. A radius of the curved corner may be selected to conform to a shape and size of the cross-section of the sealing member 132.

Figure 3:
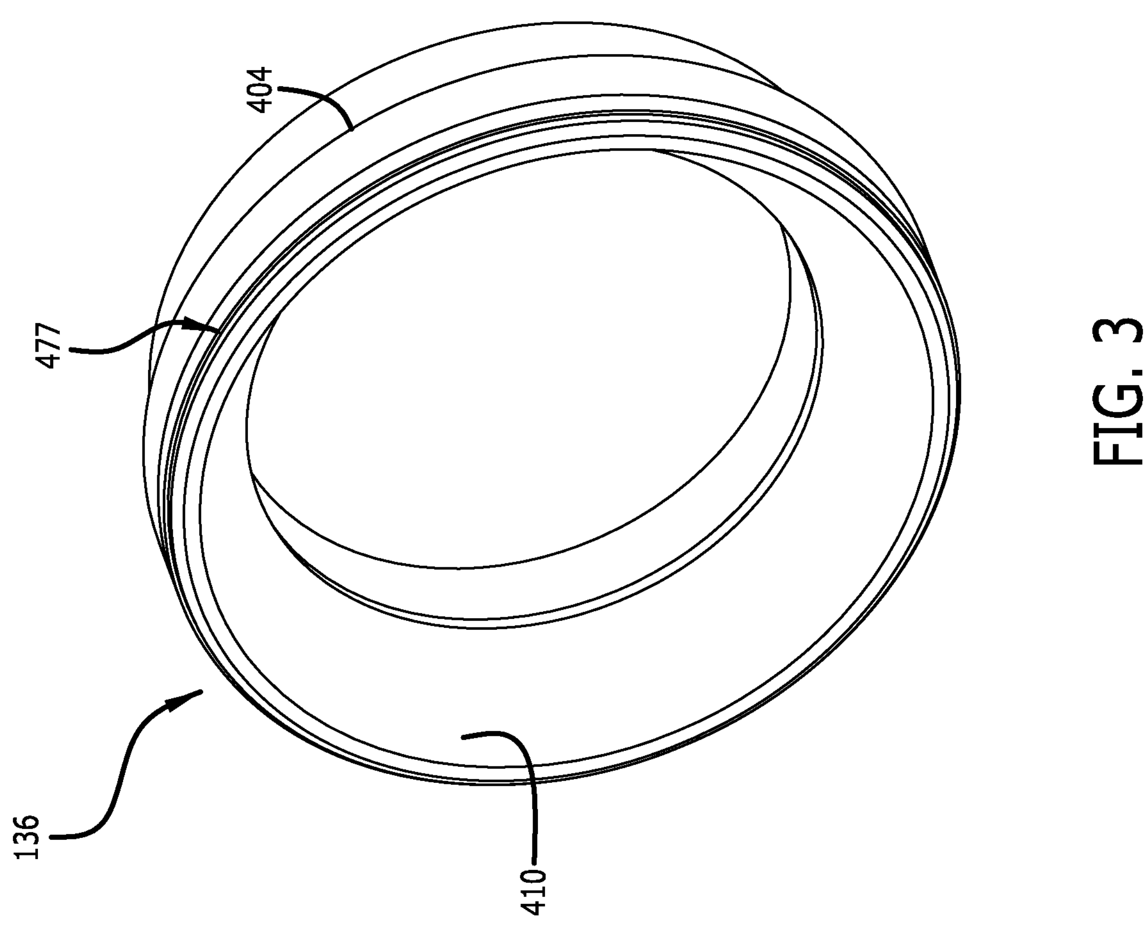
FIG. 3 is a perspective view of the protector body of FIG. 2, according to an example embodiment.
Figure 2:
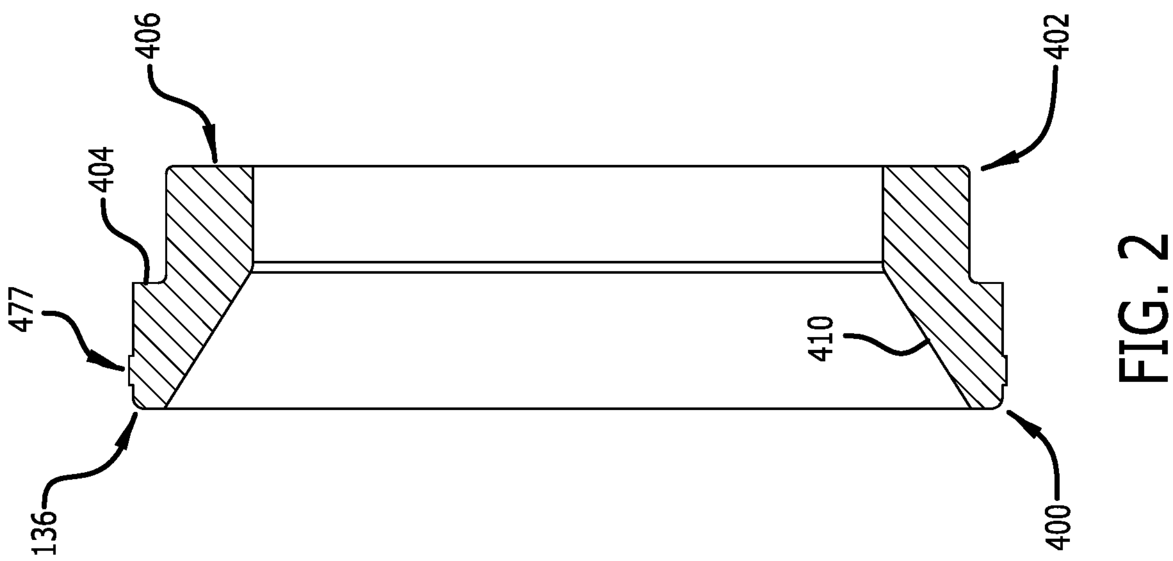
FIG. 2 is a side cross-sectional view of a protector body of the connector assembly of FIG. 1, according to an example embodiment.

Referring now to FIGS. 2 and 3, the protection ring 136 is shown, according to an example embodiment. The protection ring 136 includes a first end 400 (e.g., proximal end) and a second end 402 (e.g., distal end) opposite to the first end 400. The second end 402 is configured to fit inside the first end 200 of the connector body 124 to trap the sealing member 132 between the inner shoulder 242 and the protection ring 136. The sealing member 132 is allowed to translate axially along the longitudinal axis 122 between the inner shoulder 242 and the protection ring 136. In some embodiments, the sealing member 132 is allowed to translate a distance of 2-5 mm along longitudinal axis 122. The second end 402 is preferably cylindrical as is the larger diameter, outer body of the annular, protection ring 136, so as to form an annular, radially inward extending protection shoulder 404 acting as a stop that contacts the first end 200 of the connector body 124 to limit the relative axial positions of the protection ring 136 and connector body 124 along the longitudinal axis 122.

In addition, the protection shoulder 404 facilitates centering the protection ring 136 within the connector body 124. When the protection shoulder 404 engages the first end 200, the second end 402 extends a predetermined distance toward the inner shoulder 242, thus defining 2-5 mm of axial movement of the sealing member 132 along the longitudinal axis 122. In other words, the protection ring 136 includes a projection 406 extending away from the protection shoulder 404 that facilitates positioning of the sealing member 132 in the fluid passage along the longitudinal axis 122. The extension of the projection 406 through at least a portion of the connector body 124 assists in supporting the received fluid conduit and assists in achieving higher pressure ratings (e.g., burst failure ratings) of the connector assembly 120. Furthermore, the protection shoulder 404 reduces tolerance "stack up" that may affect the positioning of the sealing member 132 and the effectiveness of the sealing engagement between the received fluid conduit, the sealing member 132, and the rest of the connector assembly 120. Accordingly, the projection 406 assists during assembly such that calibration requirements may be reduced. Separately, the protection shoulder 404 extends radially outward only a short distance and less than the first portion diameter 209.

The protection ring 136 includes an inclined surface 410 inclined inward and toward the second end 402 of the protection ring 136 so as to generally align with the teeth 444 of the grab ring 140. The inclined surface 410 forms a generally frustoconical surface. The axial length of the protection ring 136 and the inclined surface 410 prevent the teeth 444 of the grab ring 140 from contacting and damaging the sealing member 132. The protection ring 136 can be made of a suitable plastic, e.g., including but not limited to thermoplastics such as nylon fiber.

Figure 4:
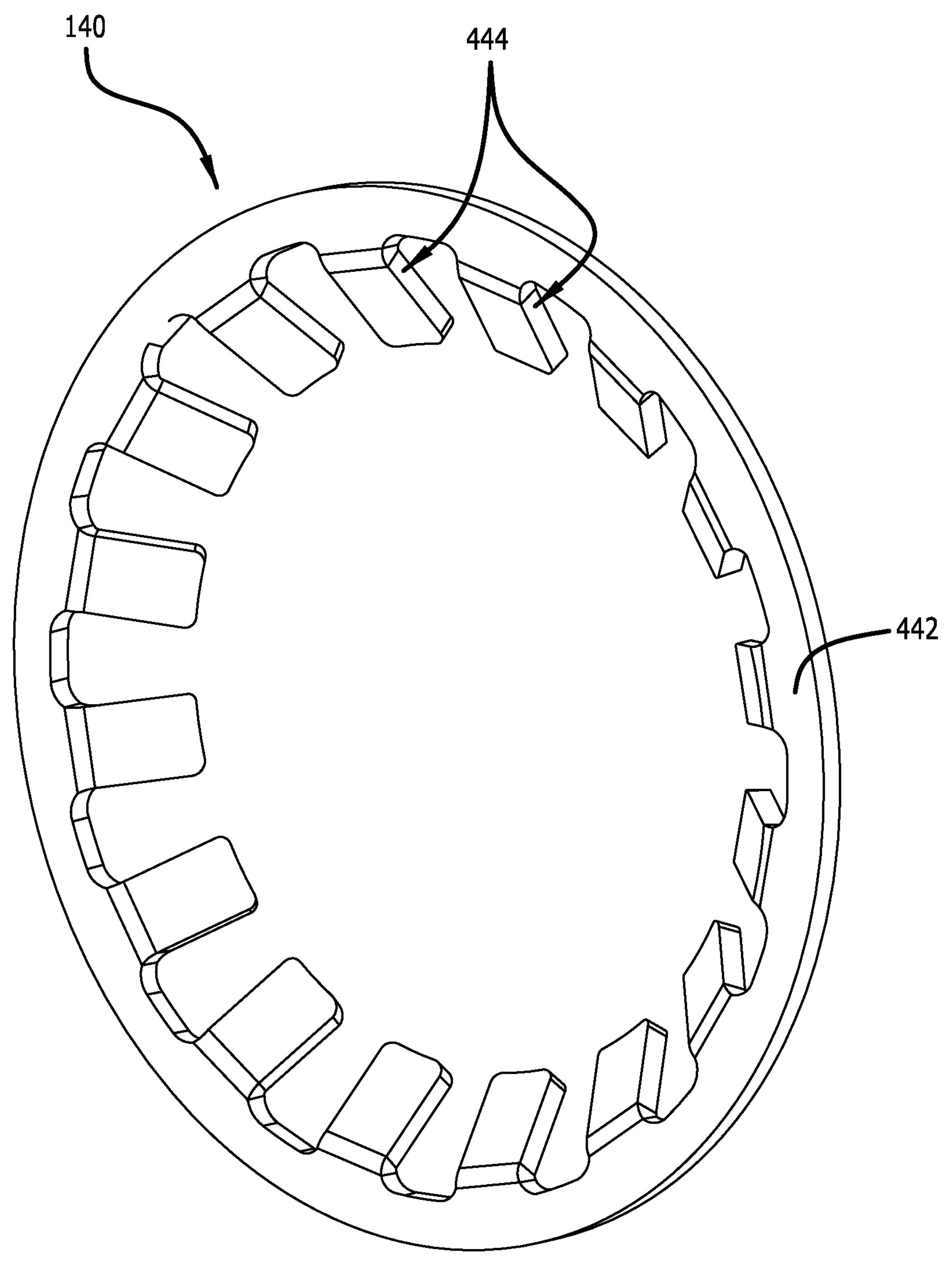
FIG. 4 is a perspective view of a grab body of the connector assembly of FIG. 1, according to an example embodiment.

Referring now to FIG. 4, the grab ring 140 is shown according to an example embodiment. The grab ring 140 is formed of metal, such as stainless steel, and includes a flat, radially extending base 442 and a plurality of teeth 444 encircling the longitudinal axis 122. The teeth 444 are equally spaced circumferentially and are sufficient in number to resiliently engage an outer surface of a fluid conduit. The teeth 444 bite into an outer surface of the fluid conduit to selectively prevent the fluid conduit from being removed from the connector assembly 120 along the longitudinal axis 122. The grab ring 140 is held between the cartridge 146 and the protection ring 136 when the connector assembly 120 is assembled. The first end 400 of the protection ring 136 engages a distal side of the base 442 while a first internal shoulder 452 on the cartridge 146 (FIG. 5) contacts the proximal side of the base 442. The teeth 444 flex radially outward and toward the inclined surface 410 when the fluid conduit passes through the opening formed by the teeth 444. One or all of the inner diameters of the protection ring 136 and the relative angles of the teeth 444 may limit the maximum diameter of the fluid conduit able to be inserted through the grab ring 140 and protection ring 136.

Figure 6:
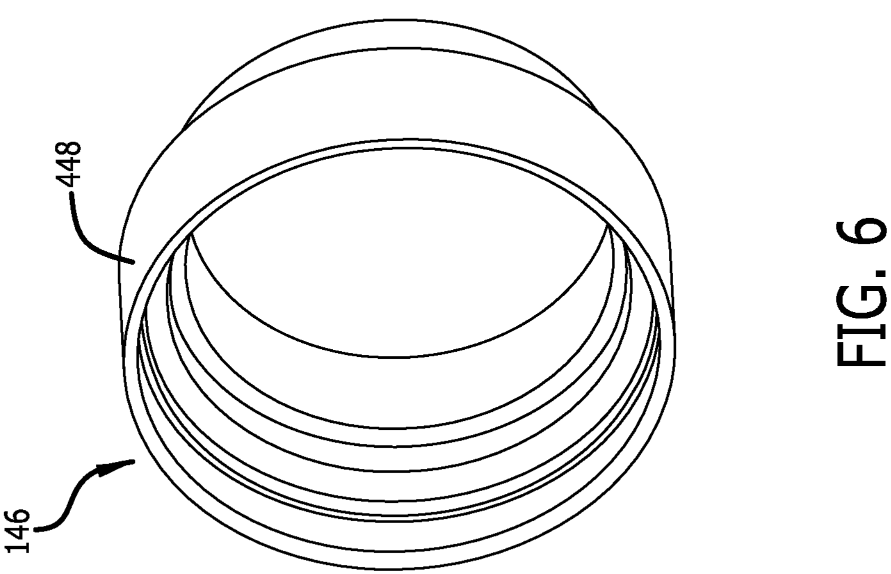
FIG. 6 is a perspective view of the cartridge of FIG. 6, according to an example embodiment.
Figure 5:
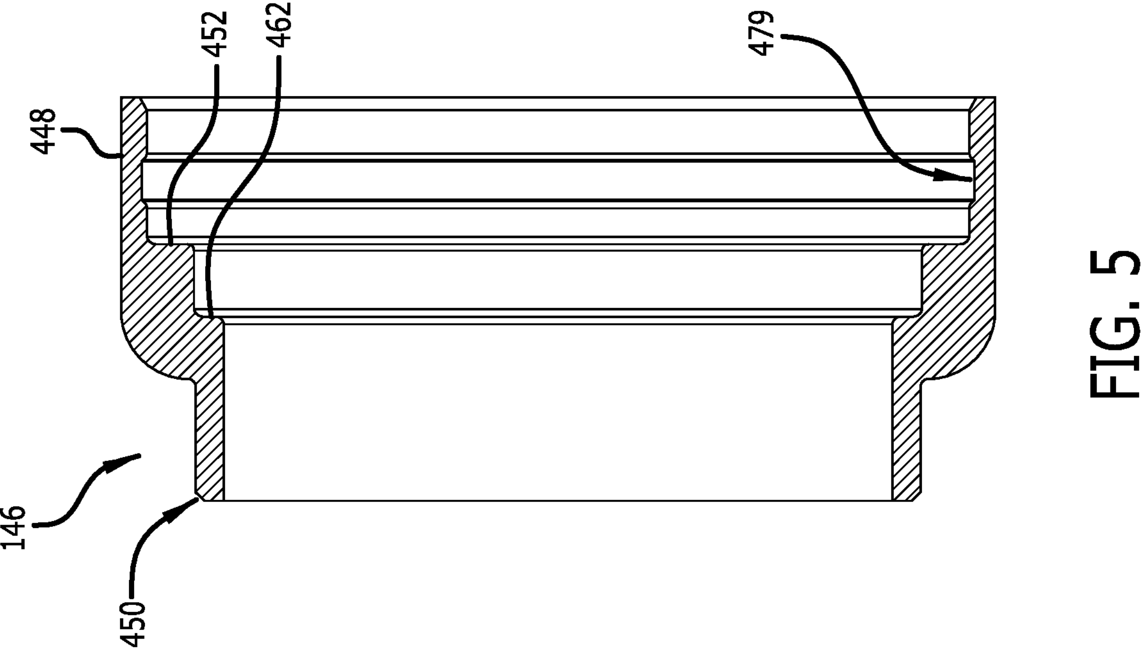
FIG. 5 is a side cross-sectional view of a cartridge of the connector assembly of FIG. 1, according to an example embodiment.

Referring now to FIGS. 5 and 6, the cartridge 146 is shown according to an example embodiment. The cartridge 146 includes a second internal shoulder 462 extending radially inward of the first internal shoulder 452. The first internal shoulder 452 forms an axially aligned face against which a stop flange 460 of the demount body 154 rests to limit axial motion of the demount body 154 relative to the cartridge 146 in one axial direction. A tubular proximal end 458 of the demount body 154 (FIG. 7) is inserted from the distal end of the cartridge 146 until the stop flange 460 contacts the second internal shoulder 462 on the cartridge 146. Thus, the cartridge 146 limits motion along the longitudinal axis 122 (in the proximal direction) of the demount body 154 and/or the grab ring 140. The demount body 154 can move in the distal direction along the longitudinal axis 122 and can spread the teeth 444 outward to disengage the teeth 444 from the fluid conduit previously engaged by the teeth 444. Thus, an application of force in the distal direction on the proximal end 458 of the demount body 154 may disengage the teeth 444 from the fluid conduit and allow removal of the fluid conduit from the connector assembly 120. The cartridge 146 may be formed of a suitable strong polymer compatible with the fluid carried in the fluid conduit. In some embodiments, the cartridge 146 is formed of POM (polyoxymethylene).

Figure 8:
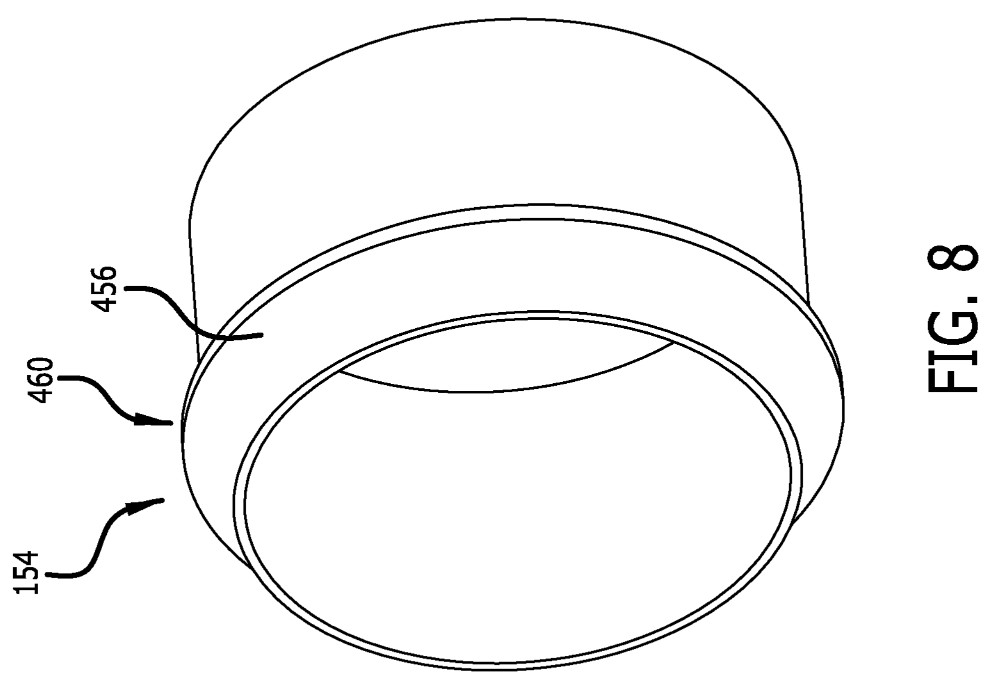
FIG. 8 is a perspective view of the disengagement body of FIG. 7, according to an example embodiment.
Figure 7:
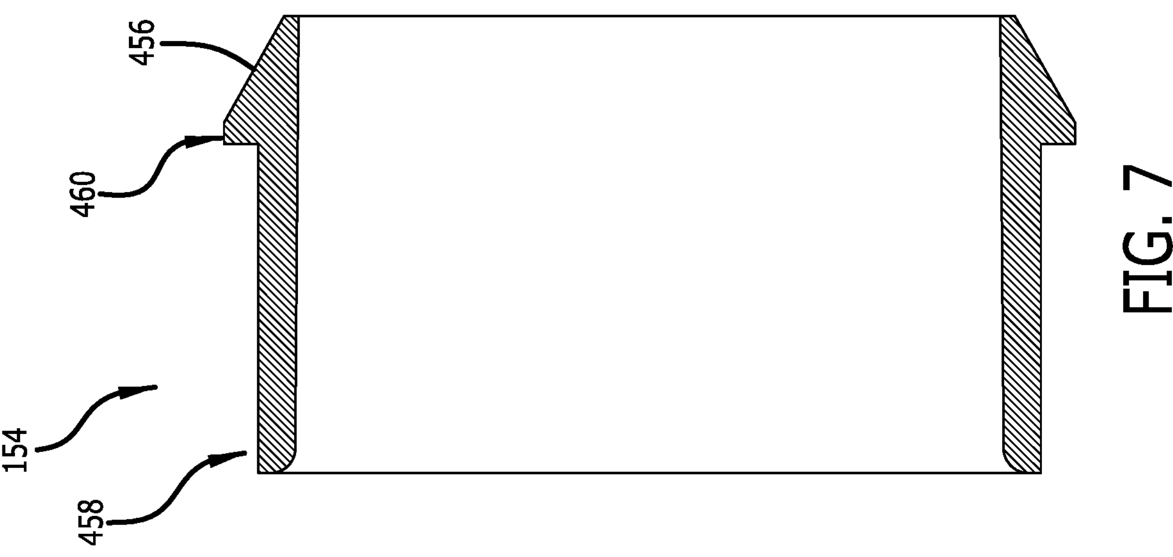
FIG. 7 is a side cross-sectional view of a disengagement body of the connector assembly of FIG. 1, according to an example embodiment.

Referring now to FIGS. 7 and 8, the demount body 154 is shown, according to an example embodiment. When the connector assembly 120 is assembled, the demount body 154 is positioned within the cartridge 146 and configured to move axially along the longitudinal axis 122 while positioned within the cartridge 146. An inclined distal end surface 456 of the demount body 154 is on a proximal side of the teeth 444, while the inclined surface 410 on the protection ring 136 is on the distal side of the teeth 444. The teeth 444 are interposed between the inclined distal end surface 456 and the inclined surface 410. Advantageously, the inclined distal end surface 456 on the demount body 154 is configured to engage the base of the teeth 444 adjacent the base 442. The demount body 154 may be formed of POM.

To further detail the construction of the connector assembly 120, the protection ring 136 advantageously has an engaging member 477 (FIG. 2) extending radially away from an outer surface of the protection ring 136 and configured for mating with another engaging part on the cartridge 146. The depicted construction of the engaging member 477 includes a slight outward protrusion, preferably a slightly raised, circumferential ring with inclined leading and/or trailing edges. When the connector assembly 120 is assembled, the engaging member 477 is located within and configured to fit into a circumferential recess 479 (FIG. 5) in the inside of the tubular wall 448 of the cartridge 146. Advantageously, when the engaging member 477 on the protection ring 136 engages the recess 479 on the cartridge 146, the protection ring 136 and the cartridge 146 are held together to secure the grab ring 140 between the first internal shoulder 452 on the cartridge 146 and the first end 400 of the protection ring 136. Moreover, the demount body 154 is preferably already seated such that the stop flange 460 engages the second internal shoulder 462 of the cartridge 146. The snap connection of the engaging member 477 and recess 479 restrains the demount body 154 from moving out of the cartridge 146. The demount body 154 can move axially between the second internal shoulder 462 and the grab ring 140. The cartridge 146 and protection ring 136 may thus form a snap-fit sub assembly which restrains movement of the demount body 154 and grab ring 140 so that these parts may collectively move as a unit.

The diameter of the tubular wall 448 is selected such that the tubular wall 448 engages the connector body 124. When the cartridge 146 engages the connector body 124, the grab ring 140 is coupled between the protection ring 136 and the first internal shoulder 452 on the cartridge 146, and the demount body 154 is located such that the inclined distal end surface 456 does not urge the teeth 444 radially outward and away from the longitudinal axis 122. Advantageously, the protection ring 136 extends into the connector body 124 and, as outlined above, allows the sealing member 132 to move axially along the longitudinal axis 122 about 2-5 mm before contacting the protection ring 136 or the inner shoulder 242 on the connector body 124. The axial motion of the sealing member 132 is insufficient to allow the sealing member 132 to skew or tilt enough to become misaligned when the distal end of the fluid conduit contacts the sealing member 132.

Figures 9, 10, 11:
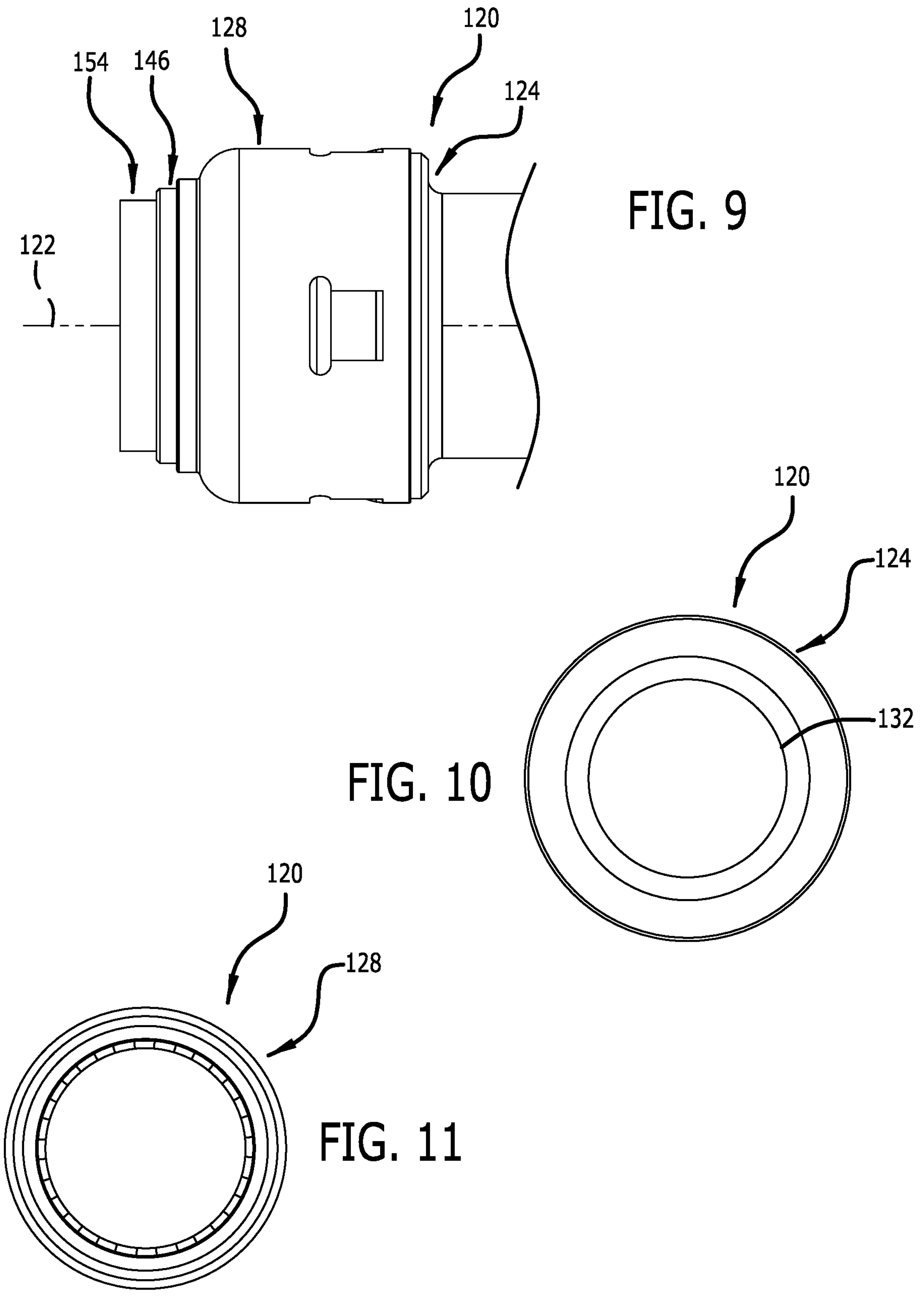
FIG. 9 is a side view of the connector assembly of FIG. 1, according to an example embodiment.
FIG. 10 is a distal view of the connector assembly of FIG. 9.
FIG. 11 is a proximate view of the connector assembly of FIG. 9.

Referring now to FIG. 9, a side view of the connector assembly 120 is shown, according to an example embodiment. The retainer sleeve 128 covers a portion of the connector body 124 when the retainer sleeve 128 is coupled to the connector body 124. A portion of the cartridge 146 extends axially out of a proximal end of the retainer sleeve 128, and a portion of the demount body 154 extends axially out of a proximal end of both the retainer sleeve 128 and the cartridge 146. In some embodiments, the connector assembly 120 does not include the end wall 204 and fluid is configured to flow through both ends of the connector assembly 120.

Referring now to FIG. 10, a distal view of the connector assembly 120 is shown, according to another example embodiment. The connector body 124 may include the end wall 204 such that the connector body 124 has a closed end that cuts off a fluid passage through the connector assembly 120 along the longitudinal axis 122. In some embodiments, the connector body 124 has a center aperture 205, such as shown in FIG. 1, which allows the fluid passage to extend all the way through the connector body 124.

Referring now to FIG. 11, a proximal view of the connector assembly 120 is shown, according to an example embodiment. The proximal end of the connector assembly 120 is configured for receiving a fluid conduit.

Figures 12, 13:
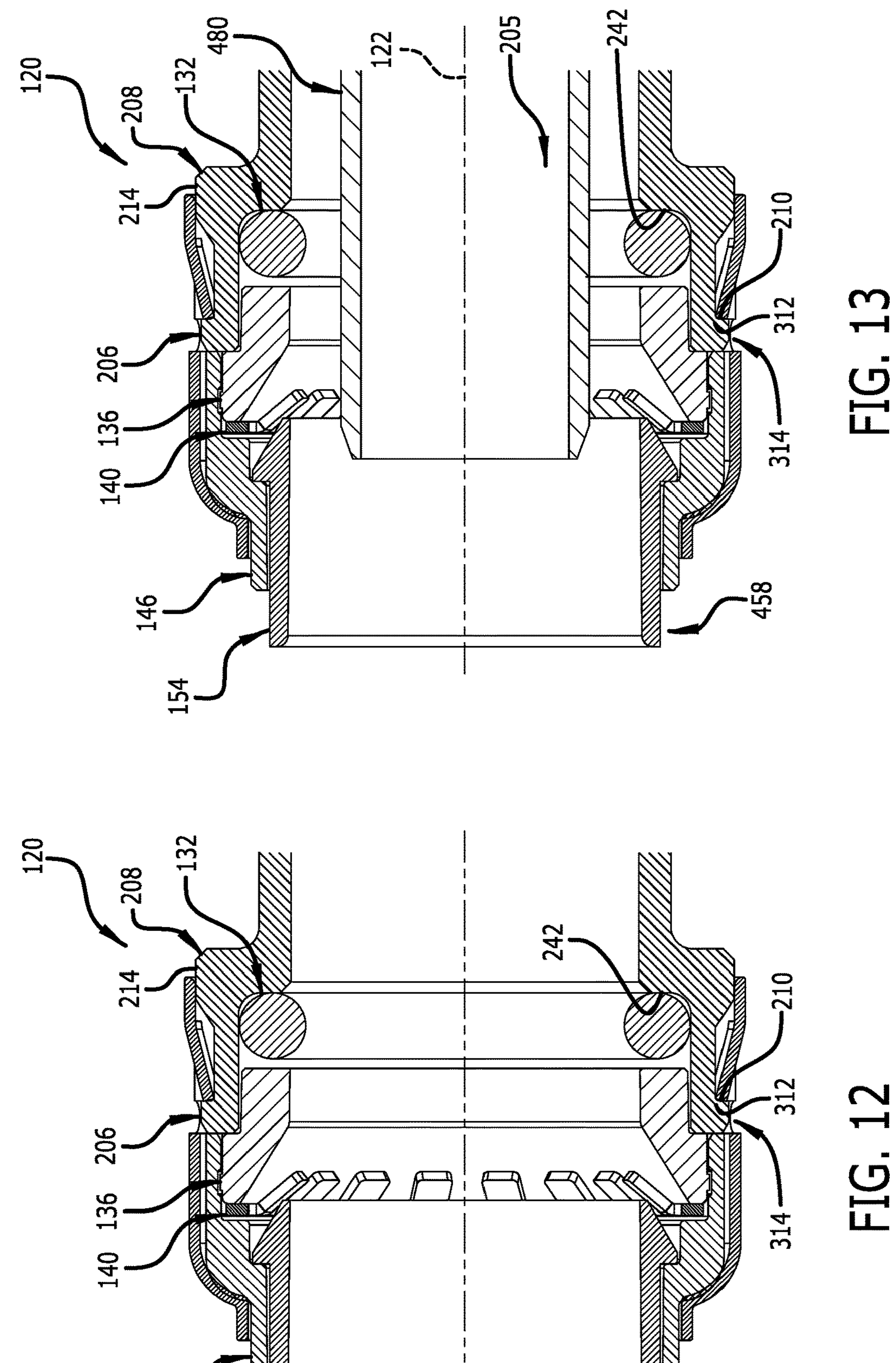
FIG. 12 is a cross-sectional view of the connector assembly of FIG. 1, according to an example embodiment.
FIG. 13 is a cross-sectional view of the connector assembly of FIG. 1, according to another example embodiment.

Referring now to FIGS. 12 and 13, side cross-sectional views of the connector assembly 120 are shown, according to example embodiments. After assembly of the connector assembly 120, a fluid conduit may then be inserted through the open end of the connector assembly 120. The fluid conduit is inserted through the retainer sleeve 128, through the demount body 154, and through the tubular wall 448 of the cartridge 146 until a distal end of the fluid conduit passes through the grab ring 140, protection ring 136, and the sealing member 132. In some embodiments, the fluid conduit contacts a hard stop, which stops relative axial movement of the fluid conduit along the longitudinal axis 122. In some embodiments, the connector assembly 120 includes a tube liner 480 that is retained within the connector assembly 120. The tube liner 480 assists in supporting the inner wall of a fluid conduit configured to be received by the connector assembly 120. In this regard, the tube liner 480 would be located inboard of the demount body 154 and configured to receive the fluid conduit.

The teeth 444 prevent the fluid conduit from being pulled out of the proximal end of the connector assembly 120. An outer diameter of the fluid conduit is larger than the inner diameter of the sealing member 132 to form a substantially fluid tight seal. Depending on the amount of fluid seal or leakage that is desired or permitted, the interference fit between the sealing member 132 and the fluid conduit may vary. The sealing member 132 is advantageously allowed to slide axially in the cylindrical recess ending with the inner shoulder 242 being at a distance of about 2-5 mm along the longitudinal axis 122. Alternatively, in some embodiments, the sealing member 132 may be pressed against the inner shoulder 242 by the second end 402 of the protection ring 136. That is, the projection 406 may, for instance, extend to a position to compress the sealing member 132. This may increase the integrity of the sealing engagement by the sealing member 132.

Further, to avoid accidental disengagement of the fluid conduit from the connector assembly 120, the tubular proximal end 458 of the demount body 154 has an axial length selected to end with the proximal end of the retainer sleeve 128 and/or the cartridge 146. Thus, the sleeve opening 368, the proximal end of the demount body 154, the tubular proximal end 458, and the proximal end 450 of the cartridge 146 are in the same general plane. Advantageously, the demount body 154 is slightly distal of the plane through the proximal end 458 and/or proximal end 450, by about 1 mm or less. The cartridge 146 contacts the connector body 124 and may be held stationary relative to the demount body 154, which is configured to move axially toward the connector body 124. To avoid accidental contact between with the proximal end of the demount body 154 and the grab ring 140, contact that may reduce the gripping force of the grab ring 140 on the fluid conduit, the proximal end of the demount body 154 may sit flush with or slightly distal of both the first end 300 of the retainer sleeve 128 and the proximal end of the cartridge 146 such that the connector body 124 and the cartridge 146 resist axial movement of the demount body 154 when a force is provided over at least the demount body 154 to the cartridge 146 or the connector body 124. In other words, the demount body 154 is positioned such that an external force being applied from at least the demount body 154 to the cartridge 146 will not allow the demount body 154 to move to a position to disengage the teeth 444 from the fluid conduit. On this basis, in order to release the fluid conduit, the connector assembly 120 may require a particular tool to engage the demount body 154 alone while not engaging another component of the connector assembly 120.

To remove the fluid conduit from the connector assembly 120, the demount body 154 is pushed axially along the longitudinal axis 122 toward the distal end of the connector assembly 120 (such as with a specific tool) and toward the connector body 124 so that the inclined surface 410 of the demount body 154 engages with and spreads the teeth 444 outward, disengaging the teeth 444 from the outer surface of the fluid conduit and allowing the fluid conduit to be removed along the longitudinal axis 122. Thus, the connector assembly 120 is structured such that part of the connector assembly 120 encircles and prevents lateral movement of the fluid conduit relative to the connector assembly 120 and prevents removal of the fluid conduit laterally from the connector assembly 120.

Advantageously, the connector assembly 120 allows parts (e.g., fluid conduits) to be arranged and snapped together for use relatively conveniently. The connector assembly 120 does not require manual deformation of any parts to create a substantially watertight engagement with a fluid conduit. The connector assembly 120 need only be placed on the end of the fluid conduit and either or both of the connector assembly 120 and the fluid conduit moved axially together in order to connect them such that the sealing member 132 provides a fluid tight connection while the connector body 124 (or 124*a*-124*g*) allows the fluid conduit to be used in a variety of fluid connections. If a user desires to disconnect the parts, the demount body 154 may be used and pressed manually to disengage the fluid conduit—e.g., a tool can be used to engage the proximal end of the demount body 154 and move it axially along the longitudinal axis 122 to release the grab ring 140 and disengage the fluid conduit.

Beneficially, the latch opening 314 does not allow manual access by a user's fingers to release the latch member 311 from catch surface 210. The use of two or more mating latches and catch(es) along with a tight fit of the retainer sleeve 128 around the enclosed parts makes it impractical to release the plurality of latches 310 sequentially from the catch surface 210. Thus, disengaging the plurality of latches 310 from the catch surface 210 is preferably not achieved without special purpose tools or without permanently deforming at least one of the retainer sleeve 128 or the connector body 124. Thus, the coupling between the plurality of latches 310 and the catch surface 210 is not a releasable (e.g., removable, selectively releasable) connection and may require deformation or breakage of the retainer sleeve 128 or the connector body 124, which may result in a visible record (e.g., indicator) that the plurality of latches 310 was disconnected. In some embodiments, the plurality of latches 310 and the catch surface 210 form a permanent connection between the retainer sleeve 128 and the connector body 124 that cannot be removed without breaking the connector assembly 120.

As outlined above, the connector assembly 120 may be formed from one or more materials. For high strength or high-pressure applications, it is believed suitable to make all parts of suitable metal, except the sealing member 132. The material used for the fluid conduit will vary with the intended use, and may include metal pipes (e.g., copper, brass, iron), stiff plastic pipes (e.g., for plumbing), flexible tubes of plastic or flexible tubes of braided metal, and braided plastic or other braided materials.

Referring now to FIG. 14, a side, cross-sectional view of the connector body 124 is shown, according to an example embodiment. The connector body 124 includes a substantially annular body having a first end 200 (e.g., distal end) and a second end 202 (e.g., proximal end) opposite to the first end 200. The first end 200 is configured to receive a fluid conduit, such as a copper pipe. As generally indicated in FIG. 14, the second end 202 is open such that fluid is configured to flow through both ends (e.g., the first end 200 and the second end 202) of the connector body 124. The second end 202 may be fluidly coupled to a pipe fitting having a plurality of the connector assemblies 120. For example, a T-fitting may include three connector assemblies 120. Other example fittings are shown in FIGS. 20-26. In some embodiments, as generally indicated in FIGS. 23A-23C, the second end 202 includes the end wall 204 that is fluidly sealed and provides a hard stop for the fluid conduit.

The connector body 124 further includes a first portion (e.g., flange) 206 extending radially away from the annular body proximate to the first end 200. The first portion 206 extends circumferentially about the longitudinal axis 122. The first portion 206 includes a first engagement surface 208 and a catch surface 210. The first engagement surface 208 is the outermost radial surface of the first portion 206. In some embodiments, the first engagement surface 208 is concentric with the longitudinal axis 122. The first engagement surface 208 defines a first portion diameter 209 (e.g., first diameter). The catch surface 210 is contiguous with the first engagement surface 208, extends circumferentially about the longitudinal axis 122, and extends substantially perpendicular to the longitudinal axis 122.

Figure 15:
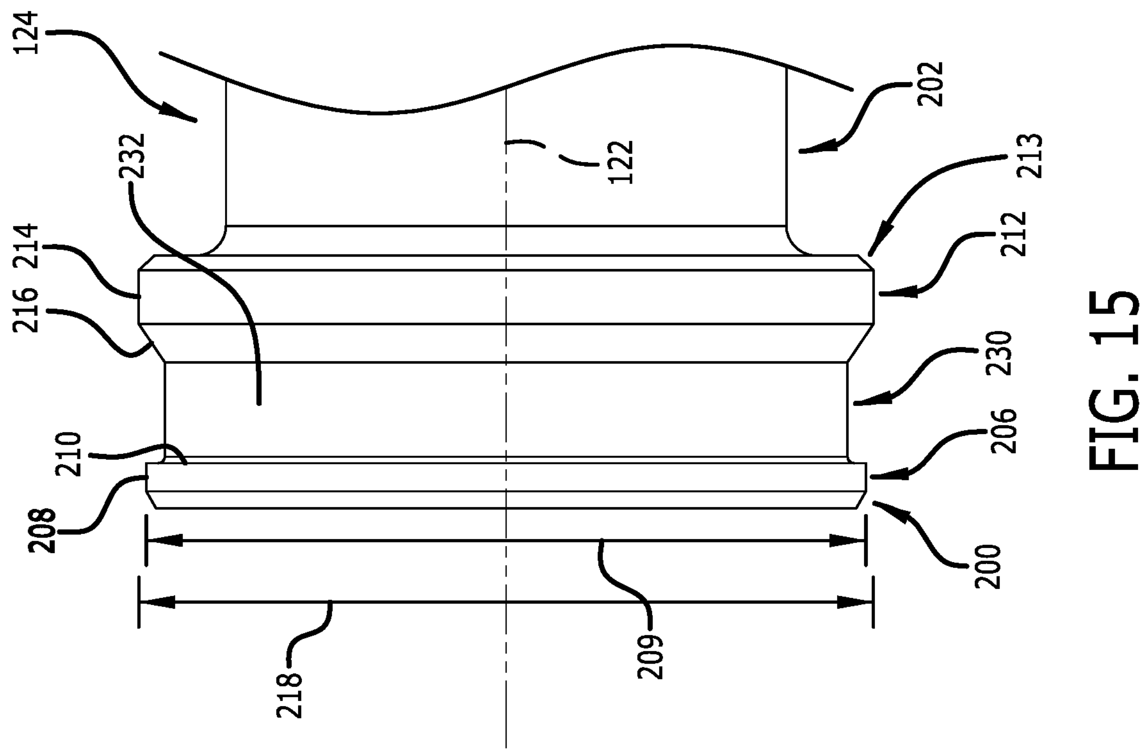
FIG. 15 is a side view of the connector body of FIG. 14, according to an example embodiment.

The connector assembly 120 further includes an interference portion (or interference feature) 212 positioned along the connector body 124. For example, as indicated in FIGS. 14 and 15, the interference portion 212 extends circumferentially about the connector body 124 at a position between the first end 200 and the second end 202. In some embodiments, the interference portion 212 extends circumferentially about the connector body 124 at a position between the first portion 206 and the second portion (e.g., second end 202). The interference portion 212 includes a second engagement surface 214. The second engagement surface 214 is the outermost radial surface of the interference portion 212. In some embodiments, the second engagement surface 214 is concentric with the longitudinal axis 122 and the first engagement surface 208. The second engagement surface 214 defines a second portion diameter 218 (e.g., second diameter).

The connector assembly 120 further includes a shoulder surface 216. The shoulder surface 216 is contiguous with the second engagement surface 214 and extends circumferentially about the longitudinal axis 122. In one embodiment, the shoulder surface 216 defines a frustoconical or conical profile that tapers to a larger diameter as the shoulder surface 216 extends along the connector body 124. The shoulder surface 216 functions as a ramp that guides a portion of the retainer sleeve 128 into engagement with the second engagement surface 214 during assembly. In some embodiments, the second portion diameter 218 is greater than the first portion diameter 209. In some embodiments, the second portion diameter 218 is greater than the first portion diameter 209 by an amount between approximately 0.1 mm (millimeters) and approximately 1.0 mm, such as 0.5 mm.

During assembly of the connector assembly 120, the interference portion 212 may be positioned between the retainer sleeve 128 and the connector body 124. In some embodiments, the interference portion 212 is coupled to the connector body 124. In the illustrated embodiment, as indicated in FIGS. 14 and 15, the interference portion 212 and the shoulder surface 216 are integrally formed with the connector body 124. As utilized herein, two or more elements are "integrally formed" with each other when the two or more elements are formed and joined together as part of a single manufacturing step to create a single-piece or unitary construction that cannot be disassembled without an at least partial destruction of the overall component. For example, the interference portion 212 and the shoulder surface 216 may be formed into the connector body 124 by turning, milling, or other suitable cutting or machining process such that the interference portion 212 and the connector body 124 are integrally formed. In other examples, the connector body 124 can be molded or otherwise formed to include the interference portion 212 and shoulder surface 216. In additional or alternative embodiments, the interference portion 212 can be part of or coupled to the retainer sleeve 128. For example, the interference portion 212 can include a plurality of ribs, protuberances, etc., or sets or groupings thereof, formed along or connected to the inner surface of the retainer sleeve 128 that are configured to engage the connector body 124 to facilitate an interference fit between the connector body 124 and the retainer sleeve 128.

In some embodiments, the interference portion 212 may be formed separately from the connector body 124 and later coupled to the connector body 124. For example, the interference portion 212 may include an annular ring, such as a circlip or other movable, detachable portion, which can be selectively positioned around the connector body 124. In addition, the shoulder surface 216 may be formed separately from the connector body 124 and later coupled to the connector body 124. For example, during assembly of the connector assembly 120, the shoulder surface 216 may be interposed between the retainer sleeve 128 and the connector body 124. In some embodiments, the shoulder surface 216 is coupled to the connector body 124. In some embodiments, the shoulder surface 216 is slidable between the first portion 206 and the interference portion 212.

Referring to FIG. 15, the interference portion 212 can include a flange or other protruding portion (e.g., a second flange 213) extending radially away from the connector body 124 at a position between the first portion 206 and the second end 202. In some embodiments, the second flange 213 is at a position approximately halfway between the first end 200 and the second end 202. In some embodiments, the second flange 213 is positioned nearer to the first end 200 than to the second end 202. The second flange 213 includes the second engagement surface 214 and the shoulder surface 216. The second engagement surface 214 is the outermost radial surface of the second flange 213.

Positioned between the first portion 206 and the interference portion 212 is a connector body groove 230 (e.g., channel or other recessed area). The connector body groove 230 defines a groove surface 232 that extends circumferentially about the longitudinal axis 122. In the illustrated embodiment, the ramped, shoulder surface 216 is contiguous with the groove surface 232. In some embodiments, the groove surface 232 is generally concentric about and parallel with the longitudinal axis 122. In alternative embodiments, the shoulder surface 216 extends between the first portion 206 and the interference portion 212 such that the shoulder surface 216 is contiguous with the catch surface 210.

Referring again to FIG. 14, an inner shoulder 242 is shown extending radially inward from an inner surface 240 of the connector body 124. The inner shoulder 242 is configured to interface with the sealing member 132 to form a substantially watertight seal between all of the connector body 124, the sealing member 132, and a fluid conduit when a fluid conduit is extended into the connector assembly 120.

Figures 16, 17:
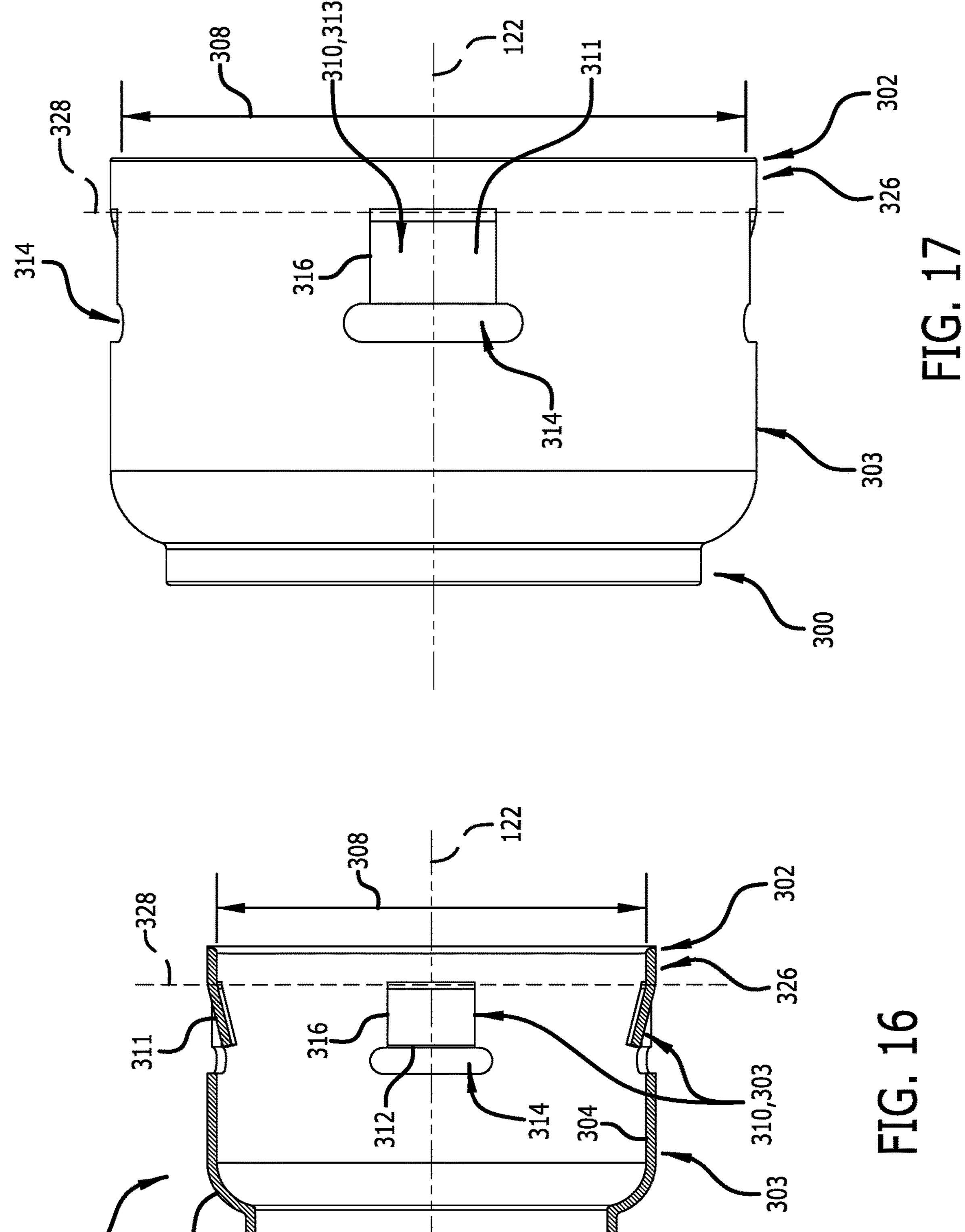
FIG. 16 is a side cross-sectional view of a retainer sleeve of the connector assembly of FIG. 1, according to an example embodiment.
FIG. 17 is a side view of the retainer sleeve of FIG. 16, according to an example embodiment.

Referring now to FIG. 16, a cross-sectional view of the retainer sleeve 128 is shown. The retainer sleeve 128 includes a substantially annular body having a first end 300 (e.g., proximal end) and a second end 302 (e.g., distal end) opposite to the first end 300. The first end 300 is configured to receive a fluid conduit, such as a copper pipe. The second end 302 is configured to receive the connector body 124 and to cover at least a portion of the connector body 124.

The retainer sleeve 128 further includes a sleeve opening 368 extending into the first end 300 and along the longitudinal axis 122. The sleeve opening 368 is sized to allow the proximal end 450 of the cartridge 146 to pass through. Advantageously, the fit between the sleeve opening 368 and the proximal end 450 of the cartridge 146 is snug (e.g., a slip fit) such that the retainer sleeve 128 radially supports the proximal end 450 of the cartridge 146, which in turn supports the proximal end 458 of the demount body 154, which further in turn supports the fluid conduit passing through the demount body 154. The first end 300 of the retainer sleeve 128 includes a rounded reduction in diameter, shown as a sleeve chamfer 384, proximate to the first end 300. The sleeve chamfer 384 increases the radial and axial stiffness of the retainer sleeve 128, allows a suitable clearance for the parts contained within the retainer sleeve 128, and facilitates retention of the components of the connector assembly. By way of example, the first end 300 of the retainer sleeve 128 is shown as including a straight portion extending axially away from the sleeve chamfer 384, which increases the strength of the retainer sleeve 128 and prevents (e.g., stops) unrolling of the retainer sleeve 128. The outer periphery of the retainer sleeve 128 preferably conforms to the outer shape of the parts inside the retainer sleeve 128, including the portion of the connector body 124 enclosed by the retainer sleeve 128. Advantageously, the second end 302 of the retainer sleeve 128 overlaps a portion of the connector body 124. The remainder of the connector body 124 will vary, as outlined above, depending on whether the connector body 124 is an in-line connector, an elbow connector, a T-connector, a Y-connector, a multi-tube connector, a blind end connector, or another type of connector.

The retainer sleeve 128 further includes a sleeve sidewall 303 having an inner sleeve surface 304 that extends between the first end 300 and the second end 302. The inner sleeve surface 304 defines a sleeve diameter 308 (e.g., third diameter). In some embodiments, the sleeve diameter 308 is greater than the first portion diameter 209 and less than the second portion diameter 218. In some embodiments, the sleeve diameter 308 is less than both the first portion diameter 209 and the second portion diameter 218.

The retainer sleeve 128 further includes a plurality of latches 310, the plurality of latches 310 including at least one latch member 311. Each of the plurality of latches 310 extends radially inward from the inner sleeve surface 304 and toward the longitudinal axis 122. Each of the plurality of latches 310 includes a resiliently flexible protrusion that is in the form of a rectangular tab. A latch opening 314 is positioned at a proximal end of each of the plurality of latches 310 and extends through the sleeve sidewall 303. In some embodiments, each of the plurality of latches 310 includes an elongated member resiliently urged in a direction toward the longitudinal axis 122 and configured to engage the catch surface 210 when the retainer sleeve 128 is coupled to the connector body 124. Each of the plurality of latches 310 is shown in a released position 313. In the released position 313, the plurality of latches 310 extends radially inward from the inner sleeve surface 304 at a first non-zero angle relative to the longitudinal axis 122. In some embodiments, the first non-zero angle may be greater than 15 degrees, such as between approximately 15 to approximately 30 degrees, inclusive, or between approximately 20 to approximately 45 degrees, inclusive, such as approximately 28 degrees, inclusive, approximately 40 degrees, inclusive. In some embodiments, the first non-zero angle is a non-zero angle of five degrees or less. Accordingly, each of the plurality of latches 310 extends transversely toward the longitudinal axis 122 in order to extend into the connector body groove 230 and engage with the catch surface 210.

Each of the plurality of latches 310 is cut into the sleeve sidewall 303 such that each of the plurality of latches 310 is integrally formed with the retainer sleeve 128. In some embodiments, each of the plurality of latches 310 includes a rectangular profile. In some embodiments, each of the plurality of latches 310 includes a trapezoidal profile. In some embodiments, each of the plurality of latches 310 includes a rounded profile. After at least one of the plurality of latches 310 is formed with the retainer sleeve 128, the at least one latch member 311 is bent radially inward toward the longitudinal axis 122. The latch opening 314 in the sidewall 303 defines a latch end 312 (e.g., free end, proximal end, etc.) of the latch member 311. Two parallel cuts 316 that are substantially parallel to the longitudinal axis 122 extend into the sleeve sidewall 303 and toward the latch opening 314 to define the remaining two sides of the generally rectangular plate forming the latch member 311. Because the sleeve sidewall 303 is curved, the latch end 312 of the latch member 311 is slightly curved at the same general curvature as the sleeve sidewall 303. When the retainer sleeve 128 is coupled to the connector body 124, the curvature of the latch member 311 may approximate the curvature of the groove surface 232. The curvature (e.g., radius) of the latch member 311 provides reinforcement to the latch member 311 and increases the burst failure pressure of the connector assembly 120.

The retainer sleeve 128 further includes an end portion or area 326 proximate to the second end 302. The end portion 326 extends between the second end 302 and the base of the plurality of latches 310. A bend plane 328 is demarcated on FIGS. 16 and 17 with a dotted line to show the approximate position of the bend of the plurality of latches 310 (e.g., a base of the plurality of the latches 310). With the retainer sleeve 128 coupled to the connector body 124, the end portion 326 at least partially engages the second engagement surface 214 of the interference portion 212. In some embodiments, such as when the sleeve diameter 308 is less than the second portion diameter 218, the end portion 326 expands to the second portion diameter 218 such that an interference fit is formed between the retainer sleeve 128 and the connector body 124. As a result, the end portion 326 is at least one of plastically or elastically deformed to correspond to the second portion diameter 218.

For example, the sleeve diameter 308 may be between about 0.001 and about 0.005 inches (approximately between about 0.0254 and about 0.127 millimeters) less than the second portion diameter 218. When the retainer sleeve 128 is pressed onto the connector body 124, the second end 302 of the retainer sleeve 128 engages the shoulder surface 216, which facilitates expansion of the end portion 326 to the second portion diameter 218.

In some embodiments, the sleeve diameter 308 may be between about 0.008 and about 0.02 inches (e.g., between about 0.2 and about 0.5 millimeters) less than the second portion diameter 218. As will be appreciated by a person of ordinary skill in the art, an interference fit with the aforementioned tolerance range is generally tighter than a standard and accepted interference fit. Herein, the terms "enhanced interference fit" and "increased interference fit" are used to refer to an interference fit that is tighter than an acceptable or typical interference fit (e.g., the shaft has a diameter that is greater than the traditionally accepted diameter for a hole of a given size). As understood by persons skilled in the art, forming an interference fit between two components outside of the accepted tolerance ranges can lead to a fit that is either too loose (e.g., a local interference fit, rigidity of the fitting may be compromised under load) or too tight (e.g., causing unintentional damage to the components during assembly and/or use, such as causing the shaft to ream a new hole, bending/breaking of the shaft, or cracking of the hole).

Figures 18, 19:
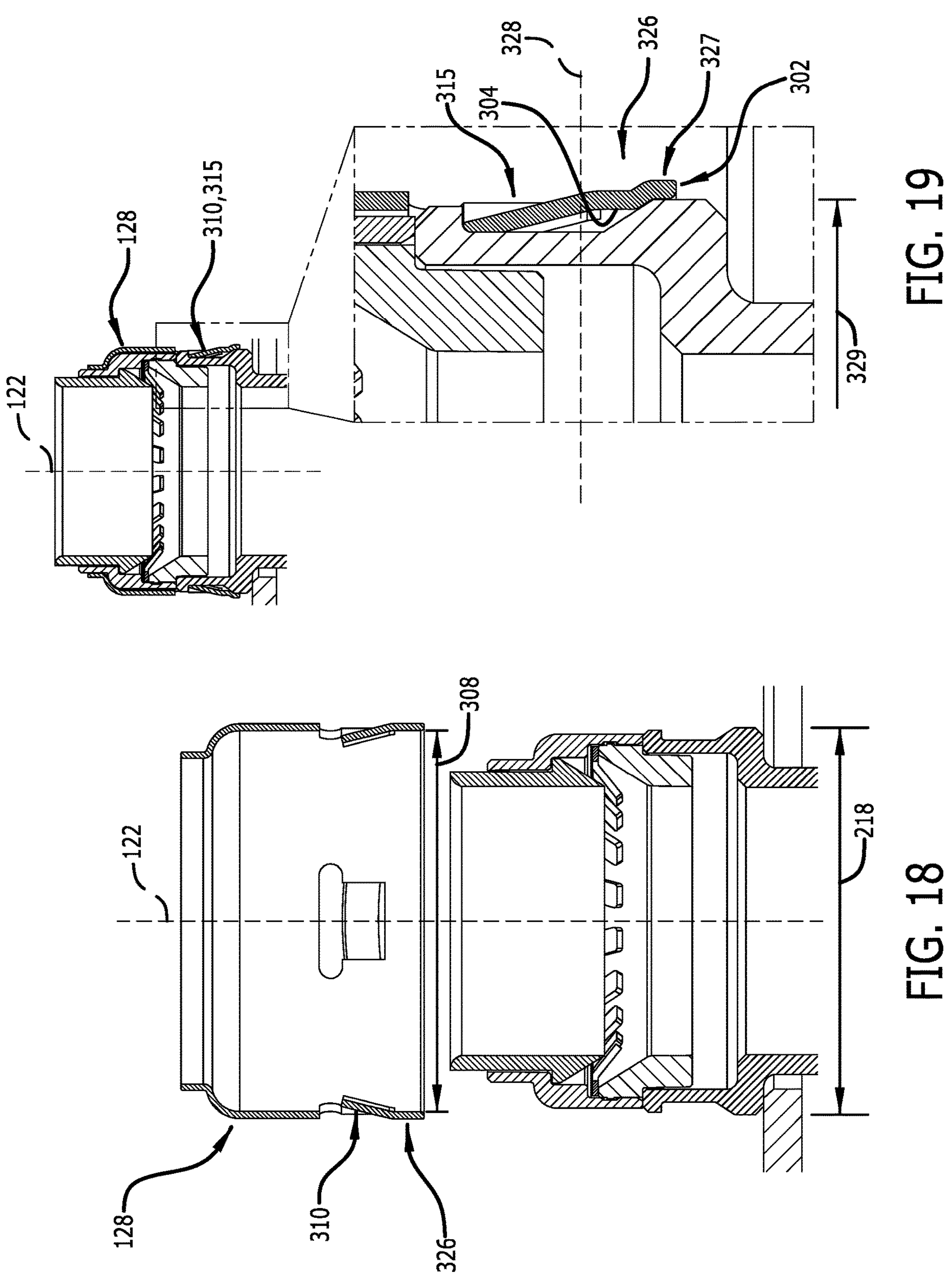
FIG. 18 is a side cross-sectional view of the retainer sleeve of FIG. 16 having a plurality of latches in a released position.
FIG. 19 is a side cross-sectional view of the retainer sleeve of FIG. 16 having the plurality of latches of FIG. 18 in a locked position.
Figures 20, 21, 22:
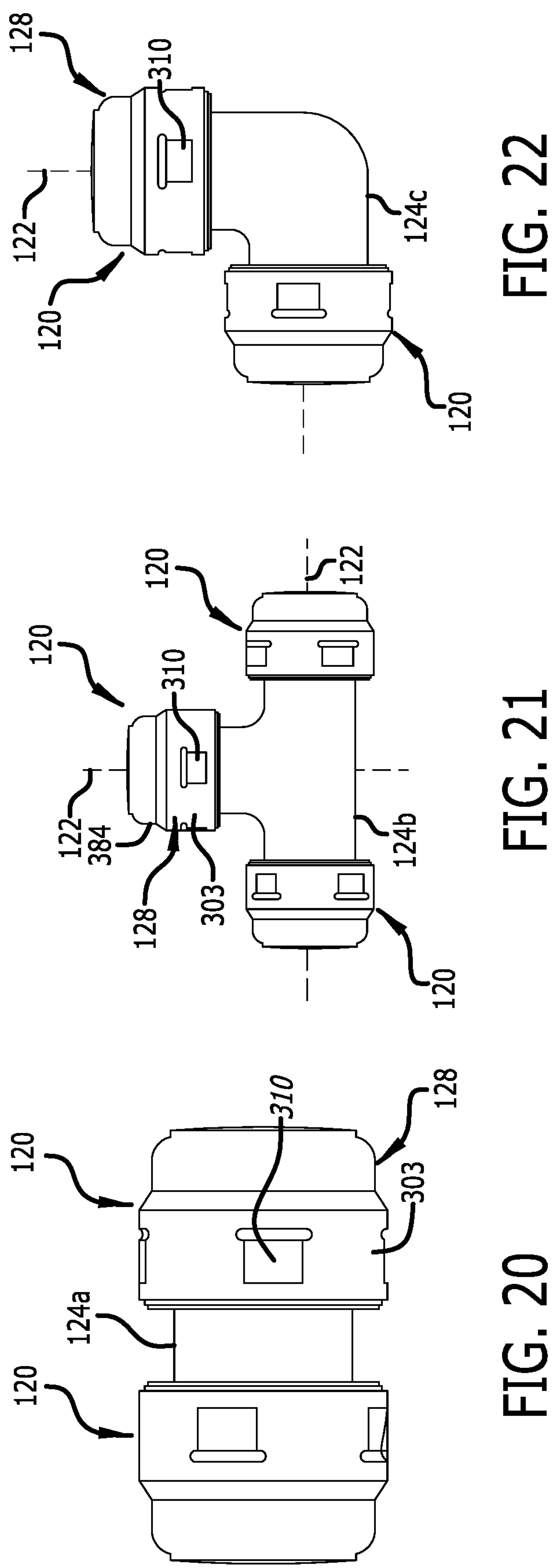
FIG. 20 is a side view of a plumbing fitting having a plurality of the connector assemblies of FIG. 1, according to an example embodiment.
FIG. 21 is a side view of a plumbing fitting having a plurality of the connector assemblies of FIG. 1, according to an example embodiment.
FIG. 22 is a side view of a plumbing fitting having a plurality of the connector assemblies of FIG. 1, according to an example embodiment.

Referring now to FIGS. 18 and 19, the retainer sleeve 128 is shown before and after being coupled to the connector body 124. Referring specifically to FIG. 18, plurality of latches 310 is in the released (e.g., initial, first, rest, unlocked, etc.) position 313. In the released positon 313, the plurality of latches 310 may extend at the first non-zero angle relative to the longitudinal axis 122. When the retainer sleeve 128 is coupled to the connector body 124, the thin sidewall 303 of the retainer sleeve 128 allows the end portion 326 to flare radially outward to the second portion diameter 218 to form a flared portion 327.

Referring now to FIG. 19, the retainer sleeve 128 is shown coupled to the connector body 124 with the plurality of latches 310 shown in a locked (e.g., second, engaged, leveraged, etc.) position 315. In the locked position 315, the plurality of latches 310 is at a position, orientation, configuration, etc. (i.e., second position, orientation, configuration, etc.) that is different from the position, orientation, configuration, etc. of the latches in the initial, released position 313 (i.e., first position, orientation, configuration, etc.), with the second position, orientation, configuration, etc. of the plurality of latches 310 improving, increasing, etc., engagement between the plurality of latches 310 and the connector body 124. For example, in the locked position 315, the free end 312 of the latch member 311 may be spaced further away from the inner sleeve surface 304 of the retainer sleeve 128 in comparison to the latch member 311 in the initial, released position 313. That is, a distance between the free end 312 of the latch member 311 and the inner sleeve surface 304 of the retainer sleeve 128 in the locked position 315 is greater than a distance between the free end 312 of the latch member 311 and the inner sleeve surface 304 of the retainer sleeve 128 in the initial released position 313. Accordingly, the plurality of latches 310 have improved/increased engagement with the catch surface 210 on the connector body 124 (e.g., the increased distance between the free end 312 of the latch member 311 and the retainer sleeve 128 increases the area or portion of engagement between the latch member 311 and the catch surface 210 (or groove surface 232), reduces the likelihood of partial or discontinuous engagement between the plurality of latches 310 and the catch surface 210 (or groove surface 232), or increases the force of engagement between the plurality of latches 310 and the catch surface 210 (or groove surface 232)). Further still, in the locked position 315, the plurality of latches 310 may extend radially inward at a second non-zero angle relative to the longitudinal axis 122, the second non-zero angle being greater than the first non-zero angle of the plurality of latches 310 in the initial, released position 313.

In some embodiments, the plurality of latches 310 are each biased radially inward (i.e., away from the inner surface of the retainer sleeve) when moved from the released position 313 to the locked position 315. In some embodiments, the flared portion 327 of the end portion 326 is substantially maintained within the end portion 326 (e.g., between the bend plane 328 and the second end 302). In some embodiments, the enhanced (e.g., increased, extreme, etc.) interference fit creates (e.g., imparts) a slight taper in the retainer sleeve 128 that extends beyond the bend plane 328 and toward the first end 300 when the retainer sleeve 128 is coupled to the connector body 124. In some embodiments, the end portion 326 is flared radially outward at the second end 302 such that the second end 302 has a diameter greater than a median diameter of the retainer sleeve 128. In some embodiments, the flared portion 327 extends radially away from the longitudinal axis 122 at a non-zero angle. When the retainer sleeve 128 is coupled to the connector body 124, the second end 302 defines a third diameter 329 greater than the second portion diameter 218.

The flaring of the end portion 326 causes deformation (e.g., levering, bending, biasing, etc.) of the plurality of latches 310 toward the longitudinal axis 122. In other words, each of the plurality of latches 310 is transitioned from the released position 313 to the locked position 315 when the end portion 326 engages the interference portion 212. In the released position 313, each of the plurality of latches 310 extends radially inward from the inner sleeve surface 304 at the first non-zero angle. In the locked position 315, each of the plurality of latches 310 is biased radially inward toward the connector body 124 to improve the engagement between the plurality of latches 310 and the connector body groove 230. In some embodiments, the plurality of latches 310 bite into (e.g., sink into) the catch surface 210 (or into groove surface 232) to improve the connection between the retainer sleeve 128 and the connector body 124.

When the end portion 326 engages the interference portion 212, the transition of the plurality of latches 310 from the released position 313 to the locked position 315 facilitates an increase in the failure strength of the connector assembly 120. In other words, when the plurality of latches 310 is in the locked position 315, the ambient burst strength is improved (e.g., due at least in part to the increased engagement of the plurality of latches 310) and the point of failure may be failure between the fluid conduit and the teeth 444 rather than at engagement of the retainer sleeve 128 with the connector body 124.

When the retainer sleeve 128 is coupled to the connector body 124, the interference portion 212 engages with the end portion 326 and causes the second end 302 of the retainer sleeve 128 to flare outward with respect to the second portion diameter 218. The flaring of the end portion 326 causes the plurality of latches 310 to deform (e.g., rotate or otherwise lever about the bend plane 328 shown in FIG. 19) and engage with the catch surface 210 (or the groove surface 232). The levering of the plurality of latches 310 can increase the engagement (e.g., are of engagement, force of engagement, etc.) between the plurality of latches 310 and the connector body 124. In some embodiments, the levering of the plurality of latches 310 improves the burst failure strength of the connector assembly 120. In particular, the retainer sleeve 128 and plurality of latches 310 collectively provide the connector assembly 120 with sufficient strength to reduce the likelihood of a burst-related failure.

In some embodiments, the ambient burst strength of the connector assembly 120 is 1,800 pounds per square inch (psi) or more. In some embodiments, the ambient burst strength is between approximately 1,000 psi and approximately 2,100 psi, inclusive. For example, the ambient burst strength may be between 1,100 psi and 2,100 psi, inclusive; between 1,200 psi and 2,100 psi, inclusive; between 1,300 psi and 2,100 psi, inclusive; between 1,400 psi and 2,100 psi, inclusive; between 1,500 psi and 2,100 psi, inclusive; between 1,600 psi and 2,100 psi, inclusive; between 1,700 psi and 2,100 psi, inclusive; and between 1,800 psi and 2,100 psi, inclusive, etc.

The flaring of the end portion 326 also serves to facilitate centering of the retainer sleeve 128 about the connector body 124 during assembly. The flared portion 327 may extend radially outward equally at all points circumferentially about the end portion 326 such that the retainer sleeve 128 is centered relative to the interference portion 212. In some embodiments, the plurality of latches 310 is compressed into the connector body 124 with a separate process after the retainer sleeve 128 is coupled to the connector body 124. For example, the retainer sleeve 128, and specifically the plurality of latches 310 and the end portion 326, may be joined to the connector body 124 (e.g., forced into the connector body 124 such that the retainer sleeve 128 is plastically deformed, such as by rolling, knurling, individually pressing each of the plurality of latches 310 into the connector body 124, etc.). In some embodiments, the enhanced interference fit between the connector body 124 and the retainer sleeve 128 helps to reduce, inhibit, or prevent rotation of the retainer sleeve 128 relative to the connector body 124 about the longitudinal axis 122 when the retainer sleeve 128 is coupled to the connector body 124. The retainer sleeve 128 may be formed of a metal, such as stainless steel, copper, brass, or other suitable material, such as polymeric materials, composite materials, etc., or combinations thereof, and is advantageously drawn to shape by successive drawing steps with the latch opening 314 and the plurality of latches 310 punched into the retainer sleeve 128 at later drawing stages.

The various connector assemblies shown in FIGS. 20-22, 23A-23C, and 24-26 may have one or more parts of the connector assembly 120 described above, and the description of those parts is not repeated although certain part numbers are shown in the Figures. In particular, it will be appreciated that the connector bodies 124*a*-124*g* may be used instead of the connector body 124 while the remaining parts of the connector assembly 120 (i.e. the retainer sleeve 128, the sealing member 132, the protection ring 136, the grab ring 140, the cartridge 146, and the demount body 154) are used to create the respective connectors. As can be seen in FIGS. 20-22, 23A-23C, and 24-26, multiple connectors are respectively used on each end of the connector bodies 124*a*-124*g* to form the connector assemblies. In configurations in which the fluid passage extends through the connector body 124*a*-124*c*, 124*e*-124*g*, a tube stop may take the form of an internal shoulder on the connector body 124*a*-124*c*, 124*e*-124*g* encircling the flow passage, and preferably forming an annular surface.

Referring generally to FIGS. 27-33, a method 500 of assembling the connector assembly 120 is shown, according to an example embodiment. At 502, a connector body, such as the connector body 124, is obtained. The connector body is positioned along an axis, such as the longitudinal axis 122. In some embodiments, the connector body includes a fluid passage (e.g., flow path) that extends at least partially therethrough. The connector body may further include an interference portion, such as the interference portion 212. In some embodiments, obtaining the connector body includes forming the connector body. The connector body may be formed with or without the interference portion. In some embodiments, the obtained connector body is the connector body 124 according to FIGS. 14 and 15.

At 504, a retainer sleeve, such as the retainer sleeve 128, is obtained. The retainer sleeve is configured for receiving over at least part of the connector body and extending circumferentially around the axis. In some embodiments, the retainer sleeve is provided with a plurality of latches. The retainer sleeve is configured for receiving over at least part of the connector body and the retainer sleeve is configured for extending circumferentially about the fluid passage. In some embodiments, providing the retainer sleeve includes forming the retainer sleeve. In some embodiments, the obtained retainer sleeve is the retainer sleeve 128 according to FIGS. 16 and 17.

Figure 28:
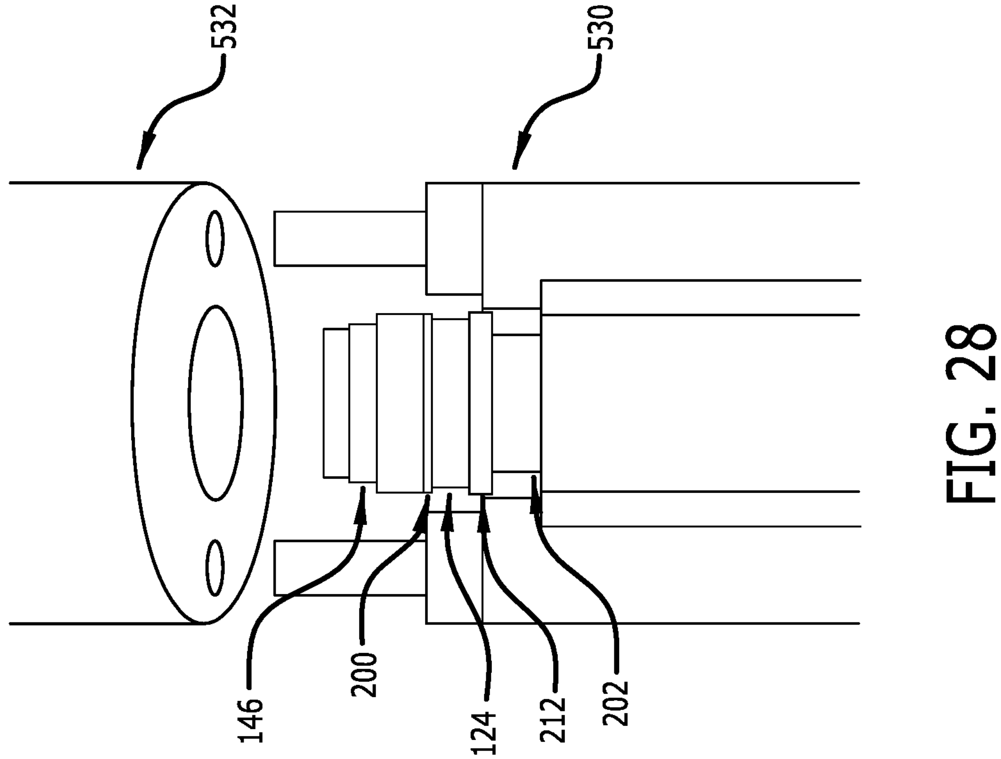
FIG. 28 is a front view of a partially assembled connector assembly positioned on a fixture.

At 506, the connector body is positioned on a fixture, such as the fixture 530. As shown in FIG. 28, the connector body is positioned on the fixture such that the first end 200 of the connector body is positioned nearer to the press 532 than the second end 202 of the connector body.

At 508, a plurality of components is positioned between the retainer sleeve and the connector body. In some embodiments, the sealing member 132, the protection ring 136, the grab ring 140, the demount body 154, and the cartridge 146 are positioned between the connector body 124 and the retainer sleeve 128. For example, as shown in FIG. 28, the connector body may be positioned on a fixture 530, and the sealing member 132, the protection ring 136, grab ring 140, the demount body 154, and the cartridge 146 are positioned on (e.g., in) the connector body 124. More specifically, the demount body 154 and the grab ring 140 are contained between the cartridge 146 and the protection ring 136 by the engaging member 477 and the circumferential recess 479, described above, to form a sub-assembly. Separately, the sealing member 132 is placed into the connector body 124 and the above-described sub-assembly is then inserted into the connector body 124 so the second end 402 of the protection ring 136 enters the cylindrical recess of the connector body 124 until the protection shoulder 404 contacts the first end of the connector body 124. In this manner, the sealing member 132 is positioned between the inner shoulder 242 of the connector body 124 and the second end 402 of the protection ring 136.

At 510, an interference portion, such as the interference portion 212, is positioned circumferentially about the axis. In some embodiments, the interference portion is positioned circumferentially about the fluid passage. In some embodiments, the interference portion is coupled to the connector body. In some embodiments, the interference portion is formed into the connector body before or after obtaining of the connector body.

Figure 29:
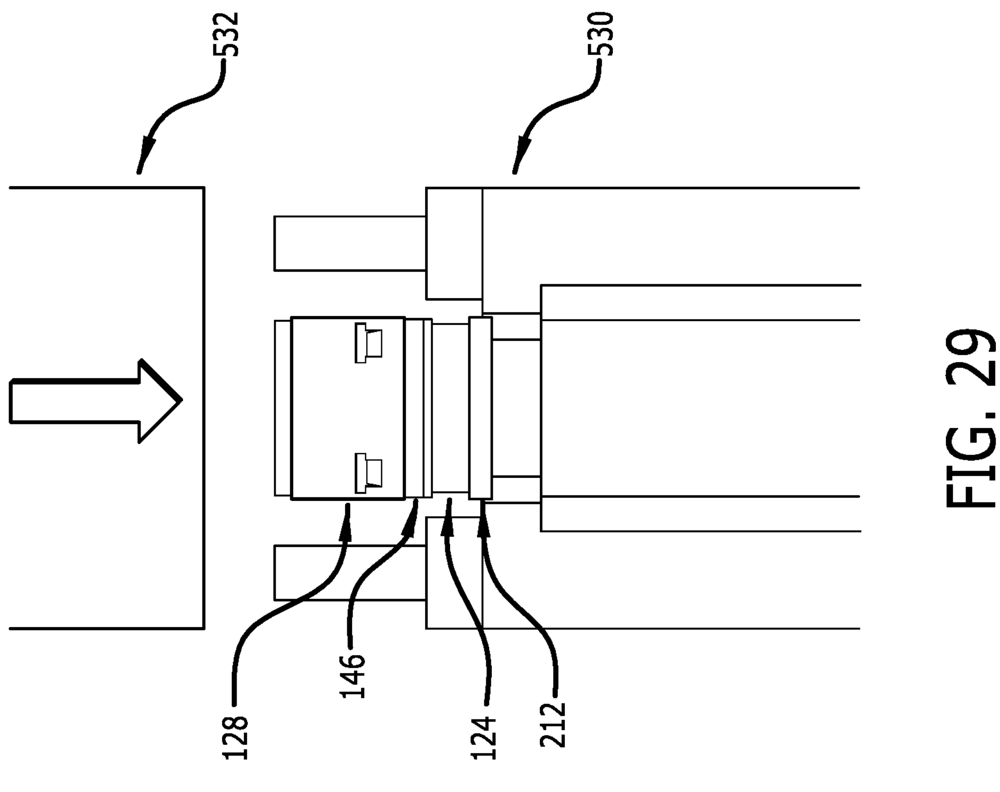
FIG. 29 is a front view of the retainer sleeve positioned over the partially assembled connector assembly of FIG. 28.

At 512, the retainer sleeve is positioned on the internal components such that the internal components are interposed between the retainer sleeve and the connector body. Referring now to FIG. 29, the retainer sleeve is shown positioned on the cartridge 146.

Figure 30:
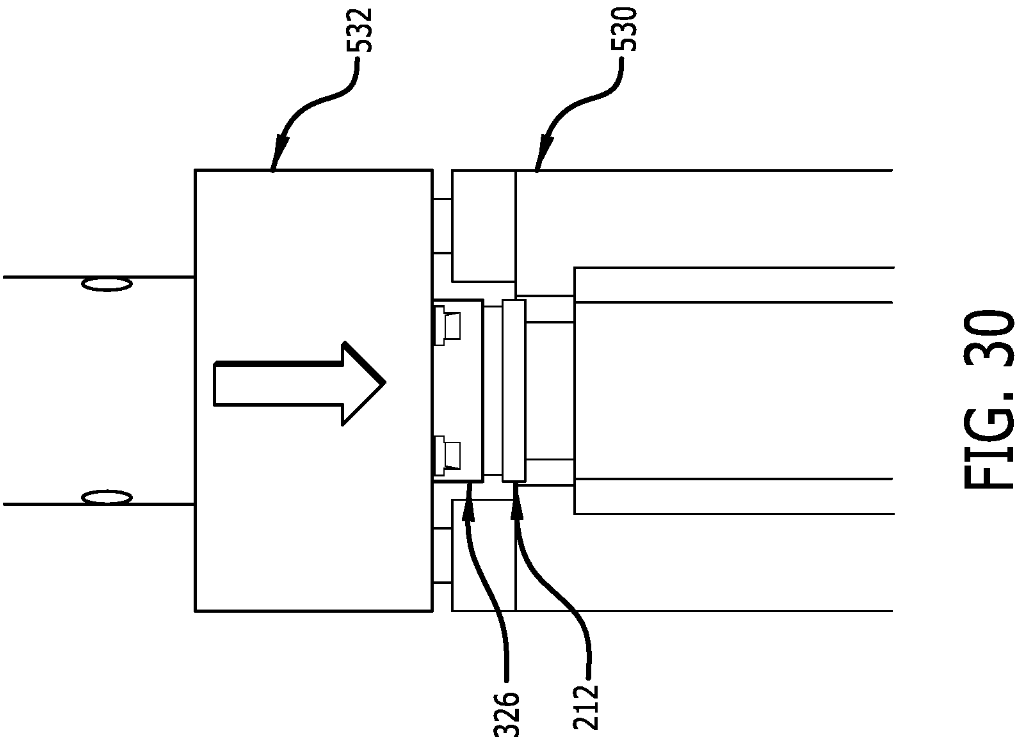
FIG. 30 is a front view of a press operable to partially couple the retainer sleeve to the connector body.

At 514, the retainer sleeve is pressed around the connector body and the connector body using a press 532. As shown in FIG. 30, the press 532 is moved downward in a direction toward the second end 202 of the connector body.

Figure 31:
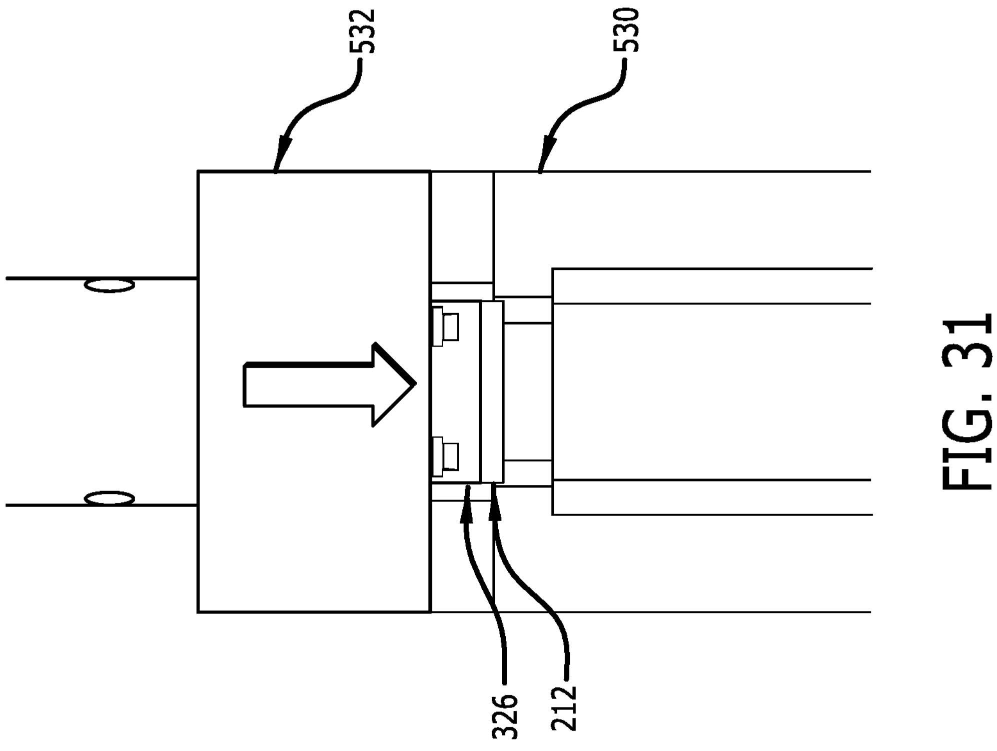
FIG. 31 is a front view of a press operable to fully couple the retainer sleeve to the connector body to form the connector assembly, according to an example embodiment.

At 516, as shown in FIG. 31, the retainer sleeve is moved (e.g., pressed) to interpose the interference portion between the connector body and the retainer sleeve. In some embodiments, the retainer sleeve is pressed around the interference portion such that the interference portion engages a portion of the inner sleeve surface proximate to the first sleeve end and causes the portion of the inner sleeve surface proximate to the first sleeve end to deform and expand in diameter to a coupling diameter greater than the inner sleeve diameter. In some embodiments, the press 532 is operated to push (e.g., press) the retainer sleeve 128 over the connector body 124.

In some embodiments, pressing the retainer sleeve around both the connector body and the interference portion forms an interference fit between the retainer sleeve and the interference portion such that rotation of the retainer sleeve relative to the connector body about the axis is prevented. In some embodiments, rotation of the retainer sleeve in relation to the connector body is substantially reduced, inhabited, or prevented by the interference fit between the retainer sleeve and the interference feature connector body.

At 518, each of plurality of latches are engaged with a catch surface of the connector body. More specifically, the retainer sleeve 128 is pressed onto the connector body 124 until each of the plurality of latches 310 engages the catch surface 210 to lock (e.g., couple) the retainer sleeve 128 to the connector body 124 and form the connector assembly 120. At the same time, the end portion 326 of the retainer sleeve 128 engages the interference portion 212 and forms an interference fit such that the retainer sleeve 128 is prevented from rotating relative to the connector body 124. In some embodiments, such as shown in FIG. 31, the interference portion is interposed between the retainer sleeve and the connector body generally at or around the same time that the plurality of latches engage the catch surface of the connector body. Moreover, the plurality of latches 310 are moved from the initial, released position 313 to the locked position 315, e.g., to increase engagement between the plurality of latches 310 and the catch surface 210. While being retained by the catch surface 210, the plurality of latches 310 extends in a transverse direction to the longitudinal axis 122. Further, the end portion 326 of the retainer sleeve 128 engages the shoulder surface 216 such that the shoulder surface 216 causes expansion of the end portion 326 to the second portion diameter 218. The expansion of the end portion 326 further causes centering of the retainer sleeve 128 about the connector body 124 and about the interference portion 212.

Figure 33:
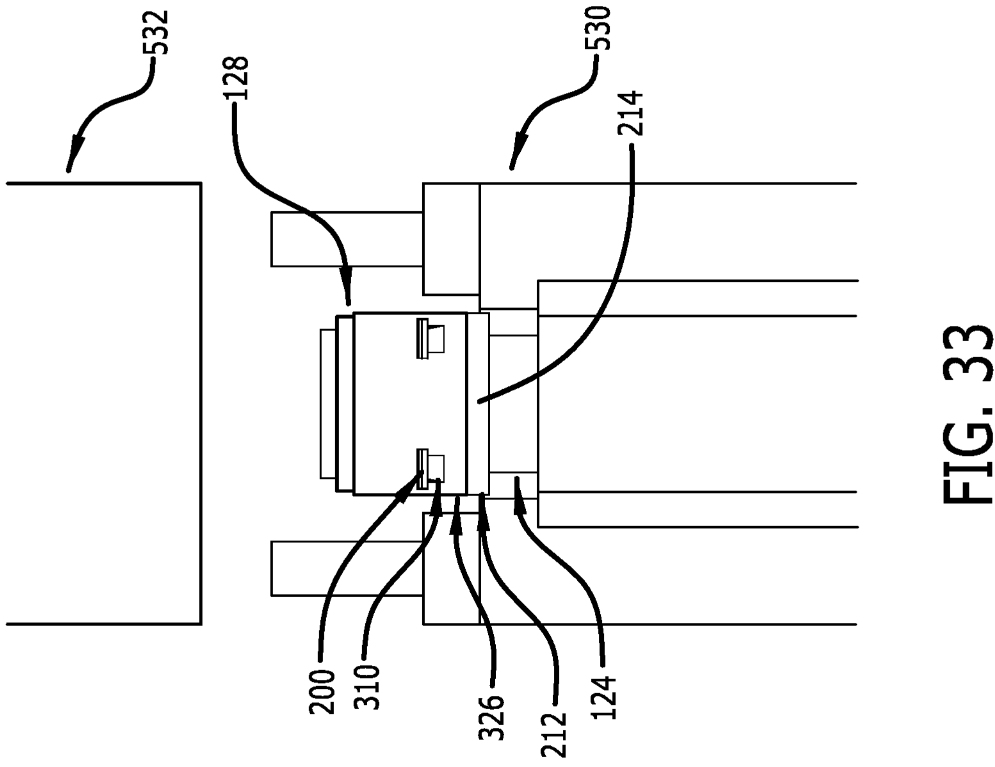
FIG. 33 is a front view of the connector assembly of FIG. 32 positioned on the fixture.
Figure 32:
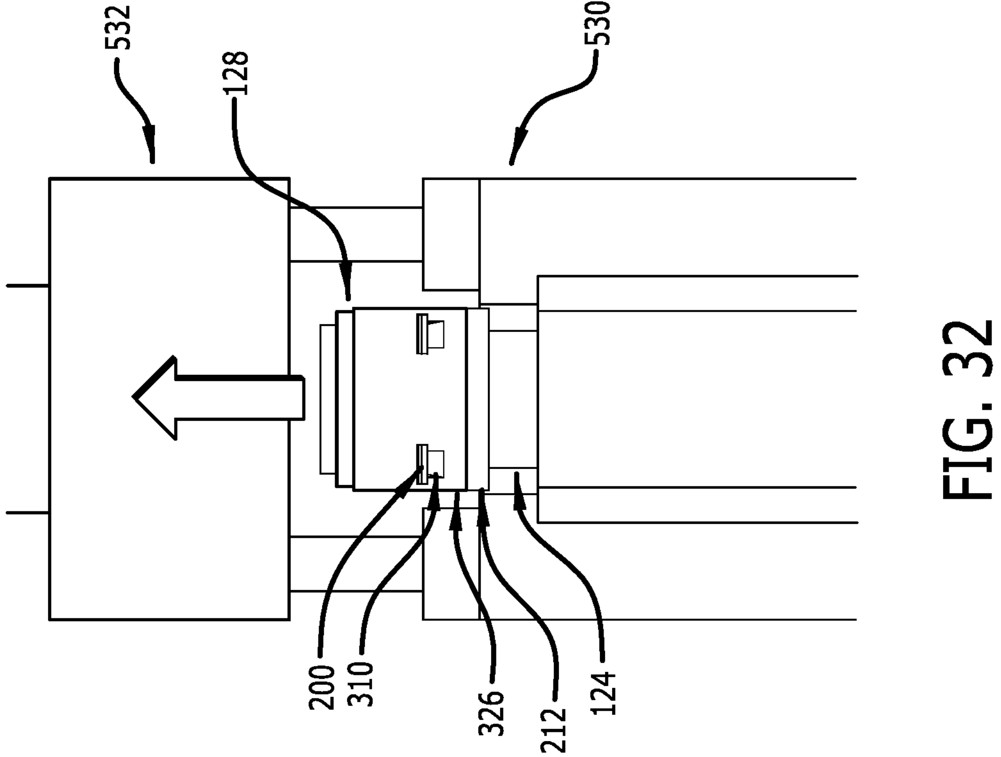
FIG. 32 is a front view of the press being operably disengaged from the fully assembled connector assembly of FIG. 31.

At 520, the press 532 is disengaged (e.g., released) from engagement with the connector assembly. As shown in FIGS. 32 and 33, the press 532 is raised above and away from the completed connector assembly 120 such that the connector assembly 120 may be removed from the fixture 530. A portion of the second engagement surface 214 may be uncovered and exposed to air after the retainer sleeve 128 is coupled to the connector body 124. In some embodiments, the retainer sleeve 128 covers and is engaged with the entirely of the second engagement surface 214 such that no portion of the second engagement surface 214 is visible after the retainer sleeve 128 is coupled to the connector body 124.

Other additional process steps can be included and steps removed without departing from the scope of the present disclosure, e.g., the plurality of latches can be engaged, e.g., pressed in, by a mechanical mechanism to further improve engagement thereof.

In a further embodiment, it would be appreciated that, for example, the retainer sleeve 128, the protection ring 136, the grab ring 140, the cartridge 146, and the demount body 154 form a sub-assembly during production. This sub-assembly may then be compressed onto the connector body 124 with the sealing member 132 positioned therein. During production of the connector assembly 120, according to an embodiment of the present disclosure, the latch member 311 may require the above sub-assemblies to be compressed to allow the latch member 311 to engage with the catch surface 210. That is, one or more of the internal components of the subassemblies may be compressed to a point that allows the latch member 311 to engage with the catch surface 210. After the compression force is released, such as at 520, one or more internal components of the sub-assemblies applies a tension force on the retainer sleeve 128. This tension force locks each of the plurality of latches 310 against the catch surface 210, thereby substantially preventing rotation of the retainer sleeve 128 about the longitudinal axis 122. The engagement of the plurality of latches 310 with the catch surface 210 in this regard also assists in providing the forces necessary to sustain the integrity of the connector assembly 120 when a (high pressure) fluid passes therethrough.

The above description is given by way of example, and not limitation. Given the above disclosure, one skilled in the art could undertake modifications that are within the scope and spirit of the present disclosure, including various ways of connecting the demount body 154 and the cartridge 146. For example, an axial slot may be formed along the length of the demount body 154. The slot may be sufficiently large such that the demount body 154 compresses enough to fit through the proximal end of the cartridge 146 and expand so the protection shoulder 404 engages the second internal shoulder 462 on the cartridge 146 to connect those parts. Similarly, while each of the plurality of latches 310 is integrally formed with the retainer sleeve 128, and the catch surface 210 is integrally formed with the connector body 124, the location of these parts may be reversed and other configurations of latches and catches may be used. Further, the various features of the present disclosure may be used alone, or in varying combinations with each other, and are not intended to be limited to the specific combination described herein. Thus, the present disclosure is not to be limited by the illustrated embodiments.

In this specification, adjectives such as left and right, top and bottom, first and second, and the like may be used to distinguish one element or action from another element or action without necessarily requiring or implying any actual such relationship or order. In addition or alternatively, references herein to the positions of elements (e.g., top, bottom, above, below) may merely be used to describe the orientation of various elements in the Figures. It should be noted that the orientation of various elements may differ according to various exemplary embodiments, and that such variations are intended to be encompassed by the present disclosure. Where context permits, reference to a component, an integer, or a step (or the alike) is not to be construed as being limited to only one of that component, integer, or step, but rather could be one or more of that component, integer, or step.

As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

Although the figures and description may illustrate a specific order of method steps, the order of such steps may differ from what is depicted and described, unless specified differently above. Also, two or more steps may be performed concurrently or with partial concurrence, unless specified differently above.

In at least one aspect, a push-to-connect fitting includes a connector body having a fluid passage that extends at least partially therethrough; a sealing member configured to form a sealing engagement with a fluid conduit; a grab ring comprising a plurality of teeth configured for coupling to the fluid conduit, a cartridge positioned adjacent to at least part of the grab ring and having a hollow portion therethrough, a retainer sleeve received over at least part of the cartridge and at least part of the connector body; a plurality of latches located on the retainer sleeve, the plurality of latches configured to secure the retainer sleeve to the connector body to facilitate retention of the sealing member, the grab ring, and the cartridge, and an interference portion positioned between the connector body and the retainer sleeve, the interference portion configured to engage the retainer sleeve to substantially prevent rotation of the retainer sleeve relative to the connector body.

In at least one aspect, the push-to-connect fitting further comprises a demount body movable within the hollow portion of the cartridge and configured to engage the plurality of teeth of the grab ring to facilitate decoupling of the plurality of teeth from the fluid conduit.

In at least one aspect, the push-to-connect fitting further comprises a protection ring positioned within the connector body and positioned between the sealing member and the grab ring, the protection ring comprising an inclined surface such that the inclined surface tapers to a smaller diameter as the inclined surface extends away from the grab ring.

In at least one aspect, the retainer sleeve includes an inner sleeve surface having a first diameter; and the interference portion includes one or more protrusions with a second diameter that is greater than the first diameter such that an interference fit exists between the interference portion and the retainer sleeve.

In at least one aspect, the retainer sleeve comprises a compliant material such that an end portion of the retainer sleeve engaged by the interference portion expands to a third diameter when the end portion engages the interference portion, the third diameter being greater than the second diameter.

In at least one aspect, in the push-to-connect fitting, the interference portion is formed as an annular member having a diameter larger than a diameter of the connector body, the interference portion is integrally formed with the connector body, and the interference portion extends radially from the connector body in a direction away from the fluid passage.

In at least one aspect, the push-to-connect fitting further comprises: a catch surface located on the connector body, wherein the plurality of latches are configured to engage the catch surface to facilitate coupling of the retainer sleeve to the connector body.

In at least one aspect, each of the plurality of latches is configured to actuate about a sidewall connected thereto and engage with the catch surface when the retainer sleeve engages the interference portion.

In at least one aspect, the plurality of latches are configured to move in a direction away from or toward the catch surface in order to engage the catch surface.

In at least one aspect, the plurality of latches may include one or more protruding portions that extend transversely from a sidewall connected thereto.

In at least one aspect, engagement of the plurality of latches with the catch surface inhibits rotation of the retainer sleeve relative to the connector body.

In at least one aspect, each of the plurality of latches includes a released position and a locked position, and when the retainer sleeve is engaged by the interference portion, the each of the plurality of latches are in the locked position.

In at least one aspect, the interference portion further comprises a shoulder surface having a frustoconical profile configured to engage an end portion of the retainer sleeve as the retainer sleeve is received over the interference portion.

In at least one aspect, the shoulder surface facilitates alignment of the retainer sleeve.

In at least one aspect, the retainer sleeve comprises a first retainer sleeve; and the connector body further comprises: a first connector end coupled to the first retainer sleeve; a second connector end coupled to a second retainer sleeve; and the first connector end and the second connector end are in fluid communication with one another via the fluid passage.

In at least one aspect, a plumbing fitting comprises a first connector assembly comprising: a first connector body centered along a first axis and configured to receive a first fluid conduit end; a first retainer sleeve coupled to the first connector body and configured to receive the first fluid conduit end; and a first interference portion interposed between the first connector body and the first retainer sleeve, the first interference portion configured to prevent rotation of the first retainer sleeve about the first axis relative to the first connector body; a second connector assembly comprising: a second connector body centered along a second axis and configured to receive a second fluid conduit end, the second connector body in fluid communication with the first connector body; a second retainer sleeve coupled to the second connector body and configured to receive the second fluid conduit end; and a second interference portion interposed between the second connector body and the second retainer sleeve, the second interference portion configured to prevent rotation of the second retainer sleeve about the second axis relative to the second connector body; and a fluid passage extending between the first connector assembly and the second connector assembly.

In at least one aspect, in the plumbing fitting, the first retainer sleeve includes a first inner sleeve surface having a first diameter; and the first interference portion has a second diameter greater than the first diameter such that an interference fit exists between the first interference portion and the first retainer sleeve.

In at least one aspect, in the plumbing fitting, the first interference portion is integrally formed with the first connector body, the first interference portion extending radially from the first connector body in a direction away from the first axis.

In at least one aspect, in the plumbing fitting, the first retainer sleeve further comprises a compliant material such that an end portion of the first retainer sleeve engaged by the first interference portion expands to a third diameter when the end portion engages the first interference portion, the third diameter being greater than the second diameter.

In at least one aspect, the plumbing fitting further comprises a catch surface located on the first connector body; and a plurality of latches located on the first retainer sleeve and configured to engage the catch surface to facilitate coupling of the first retainer sleeve to the first connector body.

In at least one aspect, in the plumbing fitting, each of the plurality of latches is configured to actuate about a sidewall connected thereto and engage with the catch surface when the first interference portion engages the retainer sleeve.

In at least one aspect, in the plumbing fitting, each of the plurality of latches includes a released position and a locked position, and when the first retainer sleeve is engaged by the first interference portion, the each of the plurality of latches are in the locked position.

In at least one aspect, a connector assembly comprises a connector body having a fluid passage that extends at least partially therethrough, the connector body comprising: a first end and a second end opposite the first end; a first connector flange extending radially from the connector body between the first end and the second end and having a first diameter; and a second connector flange extending radially from the connector body between the first connector flange and the second end, the second connector flange having a second diameter greater than the first diameter; and a retainer sleeve configured for coupling to the connector body and configured for extending around the fluid passage, the retainer sleeve comprising: a first sleeve end and a second sleeve end opposite to the first sleeve end; an inner sleeve surface having a third diameter, the third diameter being less than the second diameter; and a plurality of latches positioned circumferentially about the inner sleeve surface and extending radially inward relative to the inner sleeve surface; wherein the retainer sleeve is configured such that when the retainer sleeve is coupled to the connector body and the second connector flange engages a portion of the inner sleeve surface proximate to the first sleeve end: the portion of the inner sleeve surface proximate to the first sleeve end expands to a fourth diameter greater than the second diameter responsive to deformation of the retainer sleeve, and the plurality of latches actuate inward toward the connector body when the first sleeve end expends to the fourth diameter.

In at least one aspect, in the connector assembly, the connector body further comprises a catch surface positioned on the first connector flange and extending circumferentially about the fluid passage; and the plurality of latches are configured to engage the catch surface when the retainer sleeve is coupled to the connector body.

In at least one aspect, in the connector assembly, the connector body further comprises a shoulder surface positioned between the first connector flange and the second connector flange, the shoulder surface tapering outward toward the second connector flange to facilitate centering of the retainer sleeve around the connector body.

In at least one aspect, in the connector assembly, the third diameter is less than the second diameter by between about 0.01 and about 0.15 millimeters, inclusive, such that an interference fit is formed between the retainer sleeve and the connector body.

In at least one aspect, in the connector assembly, the third diameter is less than the second diameter by between about 0.2 and about 0.5 millimeters, inclusive, such that an interference fit is formed between the retainer sleeve and the connector body.

In at least one aspect, in the connector assembly, the retainer sleeve is a first retainer sleeve; and the connector body further comprises a first connector end coupled to the first retainer sleeve; a second connector end coupled to a second retainer sleeve, the second retainer sleeve being substantially similar to the first retainer sleeve; and the first connector end and the second connector end are in fluid communication with one another via the fluid passage.

In at least one aspect, a method of manufacturing a connector assembly is provided, the method comprising: obtaining a connector body; obtaining a retainer sleeve configured for receipt over at least part of the connector body and extending around the axis, the retainer sleeve comprising: a first sleeve end and a second sleeve end opposite to the first sleeve end; and an inner sleeve surface having an inner sleeve diameter; positioning an interference portion circumferentially about the connector body, the interference portion being an annular body having a retaining diameter greater than the inner sleeve diameter; positioning a plurality of internal components; and pressing the retainer sleeve around the connector body and the interference portion such that the interference portion is positioned between the retainer sleeve and the connector body and such that the interference portion engages a portion of the inner sleeve surface proximate to the second sleeve end and causes the portion of the inner sleeve surface proximate to the second sleeve end to expand in diameter to a coupling diameter greater than the inner sleeve diameter in response to deformation of the retainer sleeve.

In at least one aspect, pressing the retainer sleeve around the connector body and the interference portion forms an interference fit between the retainer sleeve and the interference portion such that rotation of the retainer sleeve relative to the connector body about the axis is prevented.

In at least one aspect, the connector body further comprises a catch surface; the retainer sleeve further comprises a plurality of latches configured to engage the catch surface when the retainer sleeve is coupled to the connector body, and the method further comprises pressing the retainer sleeve around the connector body and the interference portion such that the plurality of latches engage the catch surface.

In at least one aspect, the connector body further comprises a shoulder surface defining a frustoconical profile that tapers outward toward the interference portion, and the method further comprises pressing the retainer sleeve around the connector body and the interference portion such that the inner sleeve surface engages the shoulder surface, the shoulder surface (i) causing expansion of the second sleeve end to the coupling diameter and (ii) facilitating centering of the retainer sleeve about the connector body and the interference portion.

What is claimed is:

1. A push-to-connect fitting, comprising:

a connector body having a first end, an opposite second end, and a fluid passage that extends at least partially therethrough, the connector body having a first flange extending radially away from the connector body at the first end, a second flange extending radially away from the connector body between the first end and the second end, and a shoulder surface with a frustoconical profile between a connector body groove and the second flange, wherein the connector body groove is positioned between the shoulder surface and the first flange;

a sealing member configured to form a sealing engagement with a fluid conduit;

a grab ring comprising a plurality of teeth configured for coupling to the fluid conduit, a cartridge positioned adjacent to at least part of the grab ring and having a hollow portion therethrough;

a retainer sleeve received over at least part of the cartridge and at least part of the connector body;

a plurality of latches located on the retainer sleeve, the plurality of latches configured to secure the retainer sleeve to the connector body to facilitate retention of the sealing member, the grab ring, and the cartridge;

an interference portion positioned between the connector body and the retainer sleeve, the interference portion configured to engage the retainer sleeve to substantially prevent rotation of the retainer sleeve relative to the connector body;

wherein the shoulder surface is configured to engage an end portion of the retainer sleeve as the retainer sleeve is received over the interference portion.

2. The push-to-connect fitting of claim 1, further comprising a demount body movable within the hollow portion of the cartridge and configured to engage the plurality of teeth of the grab ring to facilitate decoupling of the plurality of teeth from the fluid conduit.

3. The push-to-connect fitting of claim 1, further comprising a protection ring positioned within the connector body and positioned between the sealing member and the grab ring, the protection ring comprising an inclined surface, such that the inclined surface tapers to a smaller diameter as the inclined surface extends away from the grab ring.

4. The push-to-connect fitting of claim 1, wherein:

the retainer sleeve includes an inner sleeve surface having a first diameter; and the interference portion includes one or more protrusions with a second diameter that is greater than the first diameter such that an interference fit exists between the interference portion and the retainer sleeve.

5. The push-to-connect fitting of claim 4, wherein the retainer sleeve comprises a compliant material such that an end portion of the retainer sleeve engaged by the interference portion expands to a third diameter when the end portion engages the interference portion, the third diameter being greater than the second diameter.

6. The push-to-connect fitting of claim 1, wherein the interference portion is formed as an annular member having a diameter larger than a diameter of the connector body, the interference portion is integrally formed with the connector body, and the interference portion extends radially from the connector body in a direction away from the fluid passage.

7. The push-to-connect fitting of claim 1, further comprising:

a catch surface located on the connector body, the plurality of latches configured to engage the connector body groove and the catch surface to facilitate coupling of the retainer sleeve to the connector body.

8. The push-to-connect fitting of claim 7, wherein each of the plurality of latches is configured to actuate about a sidewall connected thereto and engage with the catch surface when the retainer sleeve engages the interference portion.

9. The push-to-connect fitting of claim 7, wherein the plurality of latches are configured to move in a direction away from or toward the catch surface in order to engage the catch surface.

10. The push-to-connect fitting of claim 7, wherein engagement of the plurality of latches with the catch surface inhibits rotation of the retainer sleeve relative to the connector body.

11. The push-to-connect fitting of claim 1, wherein:

each of the plurality of latches includes a released position and a locked position, and when the retainer sleeve is engaged by the interference portion, the each of the plurality of latches are in the locked position.

12. The push-to-connect fitting of claim 1, wherein the shoulder surface facilitates alignment of the retainer sleeve.

13. The push-to-connect fitting of claim 1, wherein:

the retainer sleeve comprises a first retainer sleeve;

the connector body further comprises:

a first connector end coupled to the first retainer sleeve;

a second connector end coupled to a second retainer sleeve; and the first connector end and the second connector end are in fluid communication with one another via the fluid passage.

14. A plumbing fitting comprising:

a first connector assembly comprising:

a first connector body centered along a first axis and configured to receive a first fluid conduit end, the first connector body having a first end, an opposite second end, the first connector body having a first flange extending radially away from the first connector body at the first end, a second flange extending radially away from the first connector body between the first end and the second end, and a shoulder surface with a frustoconical profile between a connector body groove and the second flange, wherein the connector body groove is positioned between the shoulder surface and the first flange;

a first retainer sleeve coupled to the first connector body and configured to receive the first fluid conduit end; and a first interference portion interposed between the first connector body and the first retainer sleeve, the first interference portion configured to prevent rotation of the first retainer sleeve about the first axis relative to the first connector body, wherein the shoulder surface is configured to engage an end portion of the first retainer sleeve as the first retainer sleeve is received over the first interference portion;

a second connector assembly comprising:

a second connector body centered along a second axis and configured to receive a second fluid conduit end, the second connector body in fluid communication with the first connector body;

a second retainer sleeve coupled to the second connector body and configured to receive the second fluid conduit end; and a second interference portion interposed between the second connector body and the second retainer sleeve, the second interference portion configured to prevent rotation of the second retainer sleeve about the second axis relative to the second connector body; and a fluid passage extending between the first connector assembly and the second connector assembly.

15. The plumbing fitting of claim 14, wherein:

the first retainer sleeve includes a first inner sleeve surface having a first diameter; and the first interference portion has a second diameter greater than the first diameter such that an interference fit exists between the first interference portion and the first retainer sleeve.

16. The plumbing fitting of claim 15, wherein the first interference portion is integrally formed with the first connector body, the first interference portion extending radially from the first connector body in a direction away from the first axis.

17. The plumbing fitting of claim 16, wherein the first retainer sleeve further comprises a compliant material such that an end portion of the first retainer sleeve engaged by the first interference portion expands to a third diameter when the end portion engages the first interference portion, the third diameter being greater than the second diameter.

18. The plumbing fitting of claim 14, further comprising:

a catch surface located on the first connector body; and a plurality of latches located on the first retainer sleeve and configured to engage the connector body groove and the catch surface to facilitate coupling of the first retainer sleeve to the first connector body.

19. The plumbing fitting of claim 18, wherein each of the plurality of latches is configured to actuate about a sidewall connected thereto and engage with the catch surface when the first interference portion engages the retainer sleeve.

20. The plumbing fitting of claim 18, wherein:

each of the plurality of latches includes a released position and a locked position, and when the first retainer sleeve is engaged by the first interference portion, the each of the plurality of latches are in the locked position.

21. A connector assembly comprising:

a connector body having a fluid passage that extends at least partially therethrough, the connector body comprising:

a first end and a second end opposite the first end;

a first connector flange extending radially from the connector body between the first end and the second end and having a first diameter;

a second connector flange extending radially from the connector body between the first connector flange and the second end, the second connector flange having a second diameter greater than the first diameter; and a shoulder surface with a frustoconical profile between a connector body groove and the second connector flange, wherein the connector body groove is positioned between the shoulder surface and the first connector flange; and a retainer sleeve configured for coupling to the connector body and configured for extending around the fluid passage, wherein the shoulder surface is configured to engage an end portion of the retainer sleeve as the retainer sleeve is received over the connector body, the retainer sleeve comprising:

a first sleeve end and a second sleeve end opposite to the first sleeve end;

an inner sleeve surface having a third diameter, the third diameter being less than the second diameter; and a plurality of latches positioned circumferentially about the inner sleeve surface and extending radially inward relative to the inner sleeve surface;

wherein the retainer sleeve is configured such that when the retainer sleeve is coupled to the connector body and the second connector flange engages a portion of the inner sleeve surface proximate to the first sleeve end:

the portion of the inner sleeve surface proximate to the first sleeve end expands to a fourth diameter greater than the second diameter responsive to deformation of the retainer sleeve, and the plurality of latches actuate inward toward the connector body when the first sleeve end expends to the fourth diameter.

22. The connector assembly of claim 21, wherein:

the connector body further comprises a catch surface positioned on the first connector flange and extending circumferentially about the fluid passage; and the plurality of latches are configured to engage the connector body groove and the catch surface when the retainer sleeve is coupled to the connector body.

23. The connector assembly of claim 21, wherein the shoulder surface tapers outward toward the second connector flange to facilitate centering of the retainer sleeve around the connector body.

24. The connector assembly of claim 21, wherein the third diameter is less than the second diameter by between about 0.01 and about 0.15 millimeters, inclusive, such that an interference fit is formed between the retainer sleeve and the connector body.

25. The connector assembly of claim 21, wherein the third diameter is less than the second diameter by between about 0.2 and about 0.5 millimeters, inclusive, such that an interference fit is formed between the retainer sleeve and the connector body.

26. The connector assembly of claim 21, wherein the retainer sleeve is a first retainer sleeve;

the connector body further comprises:

a first connector end coupled to the first retainer sleeve;

a second connector end coupled to a second retainer sleeve, the second retainer sleeve being substantially similar to the first retainer sleeve; and the first connector end and the second connector end are in fluid communication with one another via the fluid passage.

27. A connector comprising:

a connecting body having a fluid passage that extends at least part way therethrough;

a seal configured to provide a seal with an outer portion of a fluid tube;

a cartridge located near the connecting body, the cartridge having a hollow portion therethrough;

a grab part having one or more teeth that are configured to retain the fluid tube, the grab part being located between the cartridge and the seal;

a demount part being movable within the hollow portion of the cartridge and configured to move the one or more teeth to a position to allow the fluid tube to be released;

a sleeve covering at least part of the cartridge and the connecting body; and a protecting ring configured to assist in protecting the seal, wherein the protecting ring includes an inclined surface inclined inward to generally align with the one or more teeth of the grab part, the inclined surface forming a generally frustoconical surface, the protecting ring having a stop that assists in ensuring the seal is captured in a space where retention of the seal is suitable;

wherein a latch is located on one of the sleeve or the connecting body and a mating catch is located on the other of the sleeve or the connecting body such that engagement of the latch with the catch connects the sleeve to the connecting body and assists in restraining movement of the cartridge.

28. The connector of claim 27, wherein the latch is on the sleeve and the catch is on the connecting body.

29. The connector of claim 27, wherein the latch is configured to rotate about a sidewall connected thereto in order to engage with the catch.

30. The connector of claim 29, wherein the latch includes one or more protrusions extending from the sidewall.

31. The connector of claim 27, wherein the latch is configured to move in a direction away from and towards the catch in order to engage the catch.

32. The connector of claim 27, wherein the latch extends transversely from a sidewall connected thereto.

33. The connector of claim 32, wherein the latch extends in a direction of 5 degrees transversely to the sidewall.

34. The connector of claim 27, wherein engagement of the catch with the latch assists in preventing rotation of the sleeve relative to the connecting body.

35. The connector of claim 27, wherein the demount part remains out of engagement with the teeth, and thereby does not allow the fluid tube to be released, even when an external force is applied over a distance from at least the demount part to the cartridge.

36. The connector of claim 35, wherein the external force is provided on a free end of the demount ring.

37. The connector of claim 35, wherein an end of the demount ring ends proximal to an end of the cartridge.

38. The connector of claim 27, wherein the protecting ring includes a protrusion that assists in supporting the fluid tube.

39. A connector assembly comprising:

a first connector being structurally identical to the connector set forth in claim 27; and a second connector being structurally identical to the connector set forth in claim 27.

40. A kit for connecting two fluid tubes, the kit comprising:

a plurality of connectors being structurally identical to the connector set forth in claim 27; and a fluid tube.

41. The kit of claim 40, wherein the seal is configured to move about 2-5 mm along a recess between a protecting ring and an inwardly extending shoulder on the connecting body.

42. The kit of claim 40, wherein the connecting body comprises one of a straight-line connector, a T connector, a Y-connector, an elbow connector, a blind end connector, or a connector changing diameter.

43. A connector comprising:

a connecting body having a fluid passage that extends at least part way therethrough;

a seal ring configured to provide a seal with an outer portion of a fluid tube;

a cartridge located near the connecting body, the cartridge having a hollow portion therethrough;

a grab part having one or more teeth that are configured to retain the fluid tube, the grab part being located between the cartridge and the seal ring;

a protecting ring configured to assist in protecting the seal ring, wherein the protecting ring includes an inclined surface inclined inward to generally align with the one or more teeth of the grab part, the inclined surface forming a generally frustoconical surface, the protecting ring having a stop that assists in ensuring the seal ring is captured in a space where retention of the seal ring is suitable;

a demount part being movable within the hollow portion of the cartridge and configured to move the one or more teeth to a position to allow the fluid tube to be released; and a sleeve covering at least part of the cartridge and the connecting body to provide a connection therebetween;

wherein the demount part is structured such that when an external force is applied over a distance from at least a free end of the demount part to the cartridge, the demount part does not move to a position that engages with the one or more teeth to allow the fluid tube to be released.

44. A connector for a fluid tube having an outer diameter, the connector having proximal and distal ends and extending along a longitudinal axis, comprising:

a connector body having a fluid passage extending at least part way through the body and a tube stop to limit passage of the fluid tube through the connector body;

a sealing ring encircling the longitudinal axis and having an internal diameter to provide a fluid tight seal with the fluid tube when the fluid tube passes through the sealing ring;

a protecting ring encircling the longitudinal axis, the sealing ring located between a shoulder on the connector body and the protecting ring;

a cartridge part encircling the longitudinal axis and holding the protecting ring against the connector body;

a grab ring having a plurality of teeth encircling the longitudinal axis and extending inward and toward the connector body a distance sufficient to grab the fluid tube during use, the grab ring held between the cartridge part and the protecting ring;

a demount ring encircling the longitudinal axis and held between a shoulder on the cartridge part and the grab ring, the demount ring being axially movable a distance sufficient to push the teeth outward and release the fluid tube; and a tubular sleeve encircling the cartridge part and the protecting ring and part of the connector body, the sleeve having a resiliently flexible latch latched to the connector body, and holding the cartridge part against the protecting ring and holding the protecting ring against the connector body, the sleeve having a proximal end with a sleeve opening through which the fluid tube passes;

wherein the protecting ring includes an inclined surface inclined inward to generally align with the plurality of teeth of the grab ring, the inclined surface forming a generally frustoconical surface, the protecting ring having a stop that assists in ensuring the sealing ring is captured in a space where retention of the sealing ring is suitable.

* * * * *